United States Patent
Ergun et al.

(10) Patent No.: US 9,222,616 B2
(45) Date of Patent: Dec. 29, 2015

(54) COUNTERBALANCING LIFT MECHANISMS AND METHODS

(71) Applicant: Ergotron, Inc., Saint Paul, MN (US)

(72) Inventors: Mustafa A. Ergun, Plymouth, MN (US); Robert W. Fluhrer, Prior Lake, MN (US); Saeb Asamarai, Columbia Heights, MN (US)

(73) Assignee: Ergotron, Inc., St. Paul, MN (US)

( * ) Notice: Subject to any disclaimer, the term of this patent is extended or adjusted under 35 U.S.C. 154(b) by 105 days.

(21) Appl. No.: 13/840,235

(22) Filed: Mar. 15, 2013

(65) Prior Publication Data

US 2013/0256489 A1    Oct. 3, 2013

Related U.S. Application Data

(60) Provisional application No. 61/618,138, filed on Mar. 30, 2012.

(51) Int. Cl.
*F16M 13/02*     (2006.01)
*F16M 11/10*     (2006.01)
(Continued)

(52) U.S. Cl.
CPC ............. *F16M 13/022* (2013.01); *F16M 11/10* (2013.01); *F16M 11/24* (2013.01); *F16M 11/42* (2013.01); *F16M 13/02* (2013.01); *F16M 2200/048* (2013.01)

(58) Field of Classification Search
CPC . F16M 11/046; F16M 11/24; F16M 2200/04; F16M 11/00; F16M 11/04; F16M 13/02; F16M 11/10; F16M 11/42; A47B 81/06; A47B 81/061; A47B 81/064; A47B 9/02; A47B 9/12; A47B 9/00
USPC ................... 248/648, 123.11, 162.1, 280.11, 248/295.11, 297.11; 108/144.11, 147, 37
See application file for complete search history.

(56) References Cited

U.S. PATENT DOCUMENTS 660,868 A    10/1900  Reid
2,010,214 A   8/1935  Braun
(Continued)

FOREIGN PATENT DOCUMENTS

DE    1091279 B    10/1960
DE    1171222 B     5/1964
(Continued)

OTHER PUBLICATIONS

International Search Report and Written Opinion, dated Jun. 20, 2013 for PCT Application No. PCT/US2013/032412, 10 pages.
(Continued)

*Primary Examiner* — Christopher Garft
(74) *Attorney, Agent, or Firm* — Schwegman Lundberg & Woessner, P.A

(57) ABSTRACT

Embodiments provide a counterbalancing lift mechanism for raising and lowering an electronic display. The lift mechanism includes a moving bracket in sliding engagement with a support bracket. As the moving bracket moves relative to the support bracket, a spring assembly deflects to provide a force to offset the weight of the load. A transition assembly manages the deflection of the spring assembly relative to movement of the moving bracket such that the necessary range of deflection is shorter than the moving bracket's desired range of travel. The lift mechanism also includes a cam assembly to convert the variable force from the spring assembly to a substantially constant force. In some cases the spring assembly, transition assembly, and cam assembly are all mounted to the moving bracket and move with the display. Methods for positioning an electronic display are also provided.

16 Claims, 24 Drawing Sheets

(51) Int. Cl.
*F16M 11/24* (2006.01)
*F16M 11/42* (2006.01)

(56) References Cited

U.S. PATENT DOCUMENTS

| | | | |
|---|---|---|---|
| 2,168,209 A | 8/1939 | Haupt et al. | |
| 2,178,122 A | 10/1939 | Ostler et al. | |
| 2,471,998 A | 5/1949 | Berggren | |
| 2,480,865 A | 9/1949 | Lofstrand | |
| 2,506,228 A | 5/1950 | Lofstrand, Sr. | |
| 2,657,925 A | 11/1953 | Crow | |
| 2,924,411 A * | 2/1960 | Rouverol | 248/572 |
| 3,269,035 A | 8/1966 | Bong | |
| 3,418,867 A | 12/1968 | Maeda | |
| 3,543,282 A | 11/1970 | Sautereau | |
| 3,575,368 A | 4/1971 | Thomas | |
| 3,675,597 A | 7/1972 | Oddsen et al. | |
| 3,767,181 A | 10/1973 | Van der Burgt et al. | |
| 3,890,907 A | 6/1975 | Peterson | |
| RE28,767 E | 4/1976 | Kuhlmann et al. | |
| 4,215,776 A | 8/1980 | Esler | |
| 4,351,245 A | 9/1982 | Laporte | |
| 4,357,249 A | 11/1982 | Mellor | |
| 4,387,468 A | 6/1983 | Fenne et al. | |
| 4,387,876 A | 6/1983 | Nathan | |
| 4,389,228 A | 6/1983 | Leunig | |
| 4,427,243 A | 1/1984 | Miller | |
| 4,494,720 A | 1/1985 | Gregory et al. | |
| 4,605,189 A | 8/1986 | Bruneau | |
| 4,624,434 A | 11/1986 | Lake, Jr. et al. | |
| 4,673,170 A | 6/1987 | Dykema | |
| 4,685,648 A | 8/1987 | Dobner et al. | |
| 4,691,886 A | 9/1987 | Wendling et al. | |
| 4,697,977 A | 10/1987 | Loomer et al. | |
| 4,698,886 A | 10/1987 | Kennedy | |
| 4,706,920 A | 11/1987 | Ojima et al. | |
| 4,751,884 A | 6/1988 | Ball | |
| 4,760,622 A | 8/1988 | Rohrman | |
| 4,768,762 A | 9/1988 | Lund | |
| 4,836,478 A | 6/1989 | Sweere | |
| 4,856,740 A | 8/1989 | MacLeod et al. | |
| 4,914,780 A | 4/1990 | Rogers et al. | |
| 4,920,381 A | 4/1990 | Mahoney | |
| 4,953,256 A | 9/1990 | Salmela et al. | |
| 4,953,748 A | 9/1990 | Wheelock | |
| 4,964,152 A | 10/1990 | Kaul et al. | |
| 4,964,221 A | 10/1990 | Breyer et al. | |
| 5,100,126 A | 3/1992 | Liou | |
| 5,101,735 A * | 4/1992 | Williams | 104/117 |
| 5,141,481 A | 8/1992 | Kolbel | |
| 5,143,333 A | 9/1992 | Warden | |
| 5,160,104 A | 11/1992 | Sher | |
| 5,246,191 A | 9/1993 | Moss | |
| 5,305,996 A | 4/1994 | Taniwa et al. | |
| 5,311,827 A | 5/1994 | Greene | |
| 5,400,721 A | 3/1995 | Greene | |
| 5,464,197 A | 11/1995 | Ecclesfield | |
| 5,467,504 A | 11/1995 | Yang | |
| 5,487,525 A | 1/1996 | Drabczyk et al. | |
| 5,494,447 A | 2/1996 | Zaidan | |
| 5,520,361 A | 5/1996 | Lee | |
| 5,589,849 A | 12/1996 | Ditzik | |
| 5,626,323 A | 5/1997 | Lechman et al. | |
| 5,668,570 A | 9/1997 | Ditzik | |
| 5,718,406 A | 2/1998 | Long | |
| 5,722,513 A | 3/1998 | Rowan et al. | |
| 5,738,316 A | 4/1998 | Sweere et al. | |
| 5,743,503 A | 4/1998 | Voeller et al. | |
| 5,836,562 A | 11/1998 | Danzyger et al. | |
| 5,842,672 A | 12/1998 | Sweere et al. | |
| 5,860,370 A | 1/1999 | Poniecki | |
| 5,876,008 A | 3/1999 | Sweere et al. | |
| 5,881,984 A | 3/1999 | Lin | |
| 5,899,401 A | 5/1999 | Reimann et al. | |
| 5,902,201 A | 5/1999 | Vermeer et al. | |
| 5,918,841 A | 7/1999 | Sweere et al. | |
| 5,924,665 A | 7/1999 | Sweere et al. | |
| 5,931,549 A | 8/1999 | Lindberg | |
| 5,947,429 A | 9/1999 | Sweere et al. | |
| 5,967,479 A | 10/1999 | Sweere et al. | |
| 5,992,809 A | 11/1999 | Sweere et al. | |
| 6,012,693 A | 1/2000 | Voeller et al. | |
| 6,018,847 A | 2/2000 | Lu | |
| 6,019,332 A | 2/2000 | Sweere et al. | |
| 6,026,755 A | 2/2000 | Long | |
| 6,064,373 A | 5/2000 | Ditzik | |
| 6,189,849 B1 | 2/2001 | Sweere et al. | |
| 6,227,518 B1 | 5/2001 | Sun | |
| 6,229,584 B1 | 5/2001 | Chuo et al. | |
| 6,326,955 B1 | 12/2001 | Ditzik | |
| 6,378,829 B1 | 4/2002 | Strater et al. | |
| 6,381,125 B1 | 4/2002 | Mizoguchi | |
| 6,434,851 B1 | 8/2002 | Nishina | |
| 6,474,637 B1 | 11/2002 | Spall et al. | |
| 6,522,530 B2 | 2/2003 | Bang | |
| 6,532,628 B2 | 3/2003 | Kim | |
| 6,667,824 B2 | 12/2003 | Bayart | |
| 6,994,306 B1 | 2/2006 | Sweere | |
| 6,997,422 B2 | 2/2006 | Sweere | |
| 7,032,870 B2 | 4/2006 | Sweere et al. | |
| D520,018 S | 5/2006 | Kase et al. | |
| 7,063,024 B2 | 6/2006 | Latino | |
| 7,104,203 B2 | 9/2006 | Lo | |
| 7,114,218 B1 | 10/2006 | Lin | |
| 7,124,984 B2 | 10/2006 | Yokouchi et al. | |
| 7,198,240 B2 | 4/2007 | Chen | |
| 7,252,277 B2 | 8/2007 | Sweere | |
| 7,472,459 B2 | 1/2009 | Lee et al. | |
| 7,474,522 B2 | 1/2009 | Bliven | |
| 7,658,359 B2 | 2/2010 | Jones et al. | |
| 7,677,523 B2 | 3/2010 | Stokkermans | |
| 7,690,611 B2 | 4/2010 | Asamarai | |
| 7,789,363 B2 | 9/2010 | Duan | |
| 7,832,054 B2 | 11/2010 | Nakasone | |
| 7,854,417 B2 | 12/2010 | Gan et al. | |
| 8,286,927 B2 | 10/2012 | Sweere et al. | |
| 8,925,154 B2 | 1/2015 | Ergun | |
| 2002/0088910 A1 | 7/2002 | Sweere et al. | |
| 2002/0100851 A1 | 8/2002 | Abramowsky et al. | |
| 2003/0172497 A1 | 9/2003 | Cha | |
| 2004/0035243 A1 | 2/2004 | Duval | |
| 2004/0035989 A1 | 2/2004 | Sweere et al. | |
| 2004/0118984 A1 | 6/2004 | Kim et al. | |
| 2004/0250635 A1 | 12/2004 | Sweere et al. | |
| 2005/0034547 A1 * | 2/2005 | Sweere et al. | 74/1 R |
| 2005/0035252 A1 | 2/2005 | Chen | |
| 2005/0102796 A1 | 5/2005 | Lee et al. | |
| 2005/0139734 A1 | 6/2005 | Sweere et al. | |
| 2005/0145762 A1 | 7/2005 | Sweere et al. | |
| 2005/0205731 A1 | 9/2005 | Shimizu et al. | |
| 2006/0145036 A1 | 7/2006 | Jones et al. | |
| 2006/0185563 A1 | 8/2006 | Sweere | |
| 2007/0152125 A1 | 7/2007 | Lee | |
| 2007/0206349 A1 | 9/2007 | Jacobs | |
| 2008/0026892 A1 * | 1/2008 | Asamarai et al. | 474/84 |
| 2008/0099637 A1 | 5/2008 | Pai | |
| 2008/0210841 A1 | 9/2008 | Tseng | |
| 2008/0302926 A1 | 12/2008 | Cheng et al. | |
| 2009/0095869 A1 | 4/2009 | Hazzard | |
| 2009/0189048 A1 | 7/2009 | Gan et al. | |
| 2010/0176254 A1 | 7/2010 | Sweere | |
| 2010/0193653 A1 | 8/2010 | Sweere et al. | |
| 2011/0233350 A1 * | 9/2011 | Burgess et al. | 248/123.11 |
| 2012/0025055 A1 * | 2/2012 | Huang | 248/422 |
| 2012/0069508 A1 | 3/2012 | Sweere | |
| 2012/0187256 A1 | 7/2012 | Ergun | |
| 2014/0109803 A1 | 4/2014 | Sweere et al. | |

FOREIGN PATENT DOCUMENTS

| | | |
|---|---|---|
| DE | 1611809 A1 | 1/1971 |
| DE | 3406669 A1 | 8/1985 |
| DE | 3610612 A1 | 10/1987 |
| DE | 19635236 C1 | 3/1998 |

(56) References Cited

FOREIGN PATENT DOCUMENTS

| | | |
|---|---|---|
| DE | 29908098 U1 | 7/1999 |
| EP | 0183938 A1 | 6/1986 |
| EP | 202533 A2 | 11/1986 |
| FR | 831809 A | 9/1938 |
| FR | 2037056 A1 | 12/1970 |
| GB | 785363 A | 10/1957 |
| GB | 2154442 A | 9/1985 |
| GB | 2338894 A | 1/2000 |
| GB | 2346071 A | 8/2000 |
| TW | 375316 A | 11/1999 |
| WO | WO-2013148352 A1 | 10/2013 |

OTHER PUBLICATIONS

U.S. Appl. No. 11/238,167 Office Action mailed Dec. 23, 2009, 14 pgs.

"U.S. Appl. No. 11/238,167, Amendment filed Sep. 18, 2009 in response to Non-Final Office Action mailed Mar. 18, 2009", 13 pgs.

"U.S. Appl. No. 11/238,167, Amendment filed Dec. 9, 2008 in response to Non-Final Office Action mailed Jun. 18, 2008", 12 pgs.

"U.S. Appl. No. 11/238,167, Non-Final Office Action mailed Mar. 18, 2009", 10 pgs.

"U.S. Appl. No. 11/238,167, Non-Final Office Action mailed Jun. 18, 2008", 10 pgs.

"U.S. Appl. No. 11/238,167, Response filed May 5, 2008 to Restriction Requirement mailed Apr. 4, 2008", 16 pgs.

"U.S. Appl. No. 11/238,167, Restriction Requirement mailed Apr. 4, 2008", 9 pgs.

"U.S. Appl. No. 12/729,811, Non-Final Office Action mailed May 23, 2011", 16 pgs.

"U.S. Appl. No. 12/729,811, Preliminary Amendment mailed Mar. 23, 2010", 5 pgs.

"U.S. Appl. No. 12/755,813, Non Final Office Action mailed Oct. 28, 2011", 12 pgs.

"U.S. Appl. No. 12/755,813, Notice of Allowance mailed Jun. 11, 2012", 10 pgs.

"U.S. Appl. No. 12/755,813, Preliminary Amendment filed Apr. 7, 2010", 6 pgs.

"U.S. Appl. No. 12/755,813, Response filed Apr. 30, 2012 to Non Final Office Action mailed Oct. 28, 2011", 11 pgs.

"U.S. Appl. No. 13/304,129, Advisory Action mailed Apr. 15, 2014", 3 pgs.

"U.S. Appl. No. 13/304,129, Final Office Action mailed Jan. 29, 2014", 9 pgs.

"U.S. Appl. No. 13/304,129, Non Final Office Action mailed Jun. 18, 2014", 8 pgs.

"U.S. Appl. No. 13/304,129, Non Final Office Action mailed Jul. 29, 2013", 8 pgs.

"U.S. Appl. No. 13/304,129, Non Final Office Action mailed Dec. 26, 2012", 7 pgs.

"U.S. Appl. No. 13/304,129, Notice of Allowance mailed Sep. 26, 2014", 8 pgs.

"U.S. Appl. No. 13/304,129, Preliminary Amendment filed Nov. 23, 2011", 6 pgs.

"U.S. Appl. No. 13/304,129, Response filed Mar. 27, 2014 to Final Office Action mailed Jan. 29, 2014", 11 pgs.

"U.S. Appl. No. 13/304,129, Response filed Apr. 26, 2013 to Non Final Office Action mailed Dec. 26, 2012", 9 pgs.

"U.S. Appl. No. 13/304,129, Response filed Apr. 30, 2014 to Advisory Action mailed Apr. 15, 2014 and Final Office Action mailed Jan. 29, 2014", 13 pgs.

"Application U.S. Appl. No. 13/304,129, Response filed Sep. 10, 2014 to Non Final Office Action mailed Jun. 18, 2014", 14 pgs.

"U.S. Appl. No. 13/304,129, Response filed Oct. 29, 2013 to Non Final Office Action mailed Jul. 29, 2013", 10 pgs.

"U.S. Appl. No. 13/304,129, Response filed Dec. 10, 2012 to Restriction Requirement mailed Sep. 10, 2012", 4 pgs.

"U.S. Appl. No. 13/304,129, Restriction Requirement mailed Sep. 10, 2012", 6 pgs.

"U.S. Appl. No. 13/304,129, Supplemental Preliminary Amendment filed Feb. 20, 2014", 3 pgs.

"International Application Serial No. PCT/US2004/024622, International Preliminary Report on Patentability dated Feb. 6, 2006", 10 pgs.

"International Application Serial No. PCT/US2004/024622, International Search Report mailed Feb. 25, 2005".

"International Application Serial No. PCT/US2004/024622, Written Opinion mailed Feb. 25, 2005", 9 pgs.

"International Application Serial No. PCT/US2013/032412, International Preliminary Report on Patentability mailed Oct. 9, 2014", 7 pgs.

"Machine Translation of DE 1091279B, published Oct. 20, 1960", 4 pgs.

"Machine Translation of DE 1171222B, published May 27, 1964", 7 pgs.

"Machine Translation of DE 1611809A1, published Jan. 14, 1971", 12 pgs.

"Machine Translation of FR 831,809, published Sep. 15, 1938", 9 pgs.

"Chinese Application Serial No. 201380018018.8, Office Action mailed Jul. 31, 2015", (w/ English Translation), 11 pgs.

\* cited by examiner

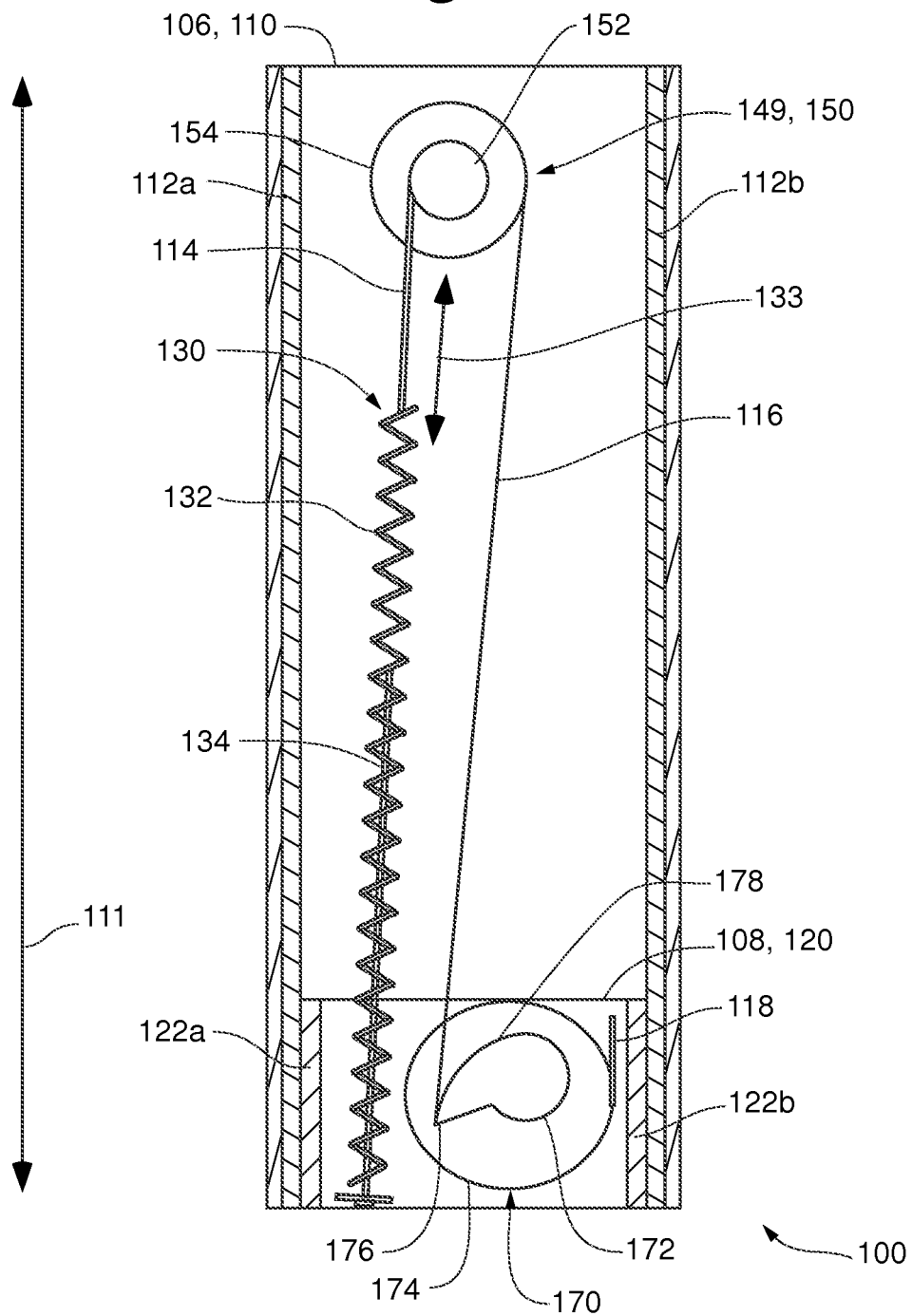

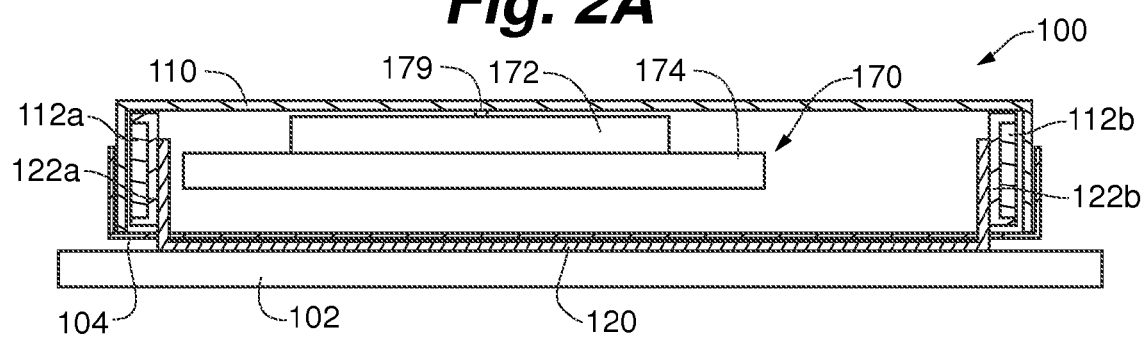
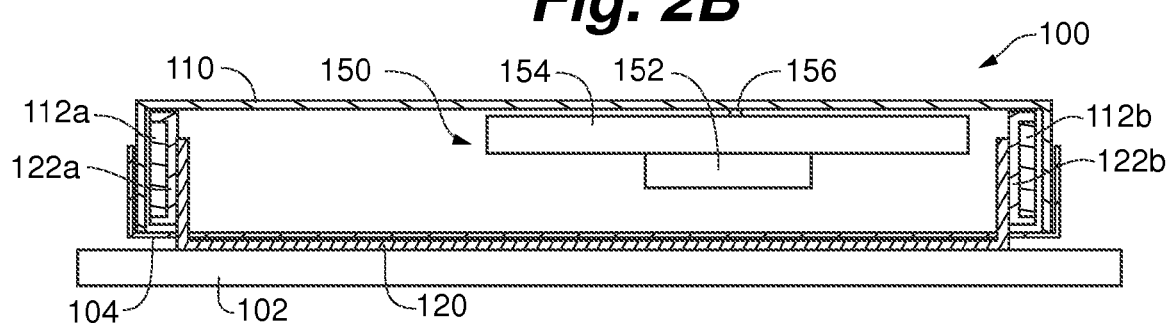
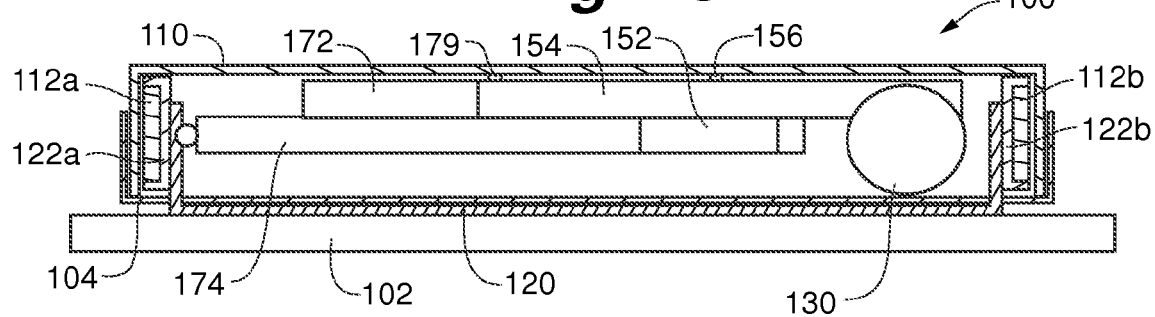

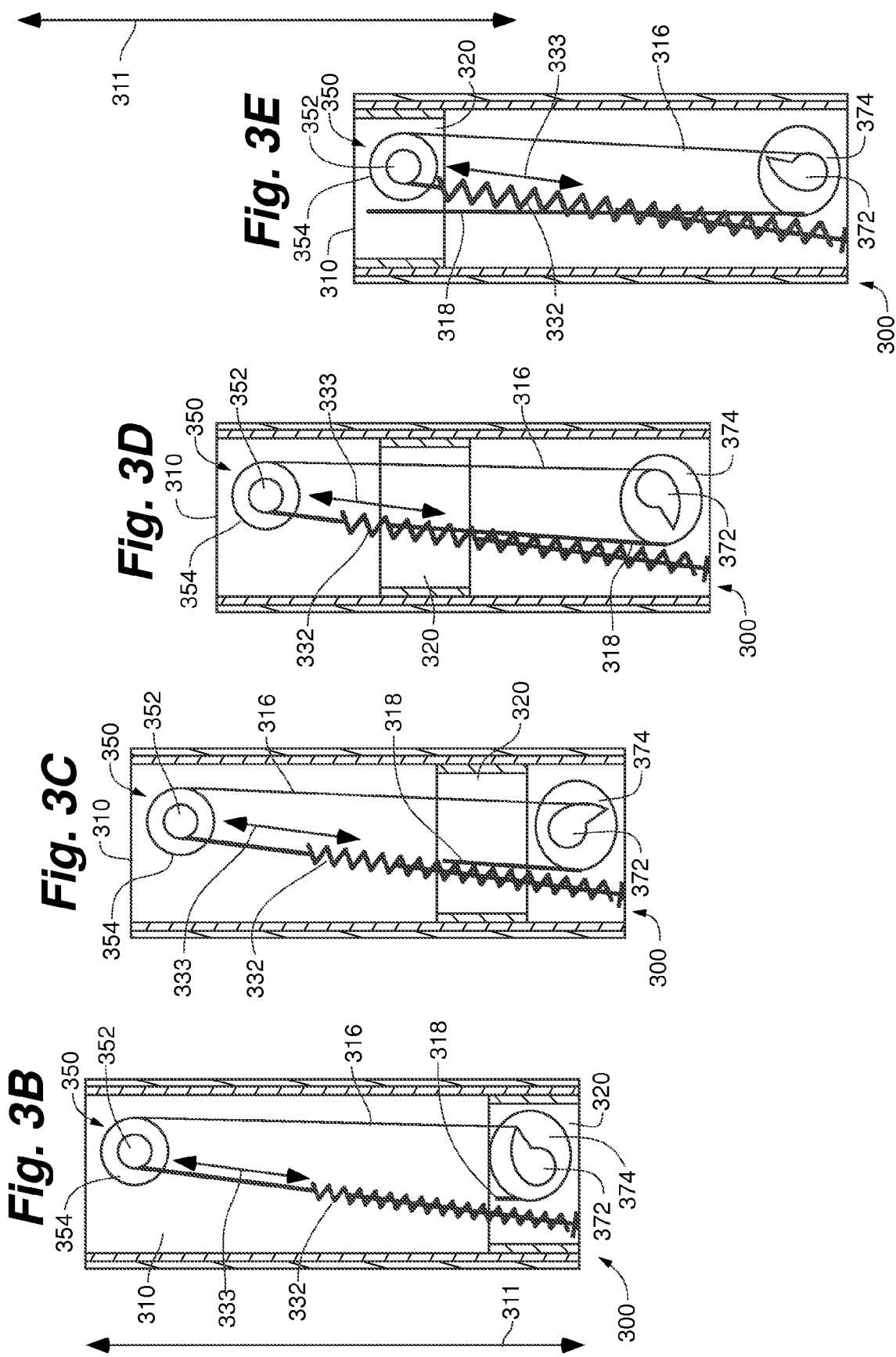

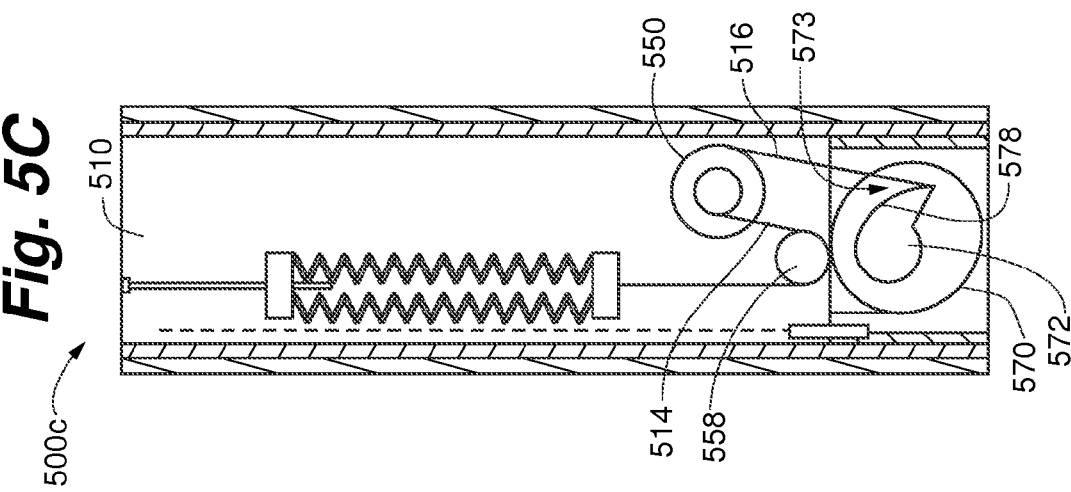
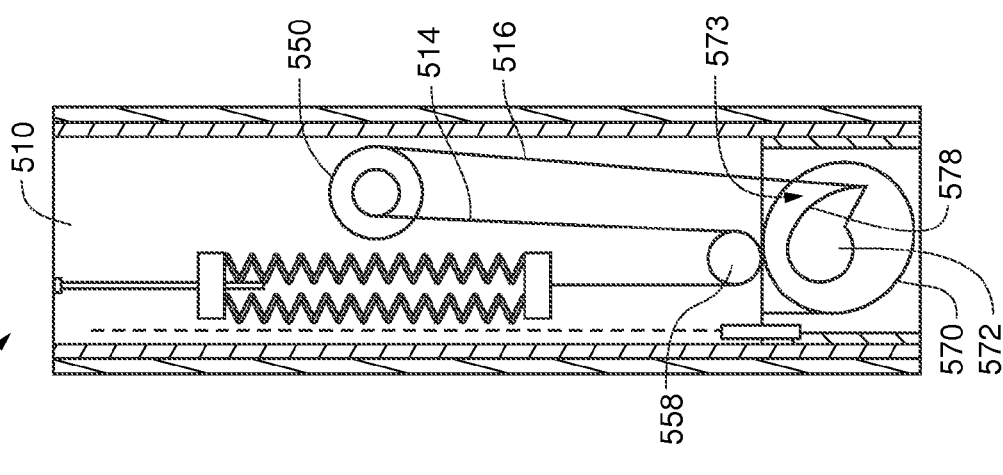
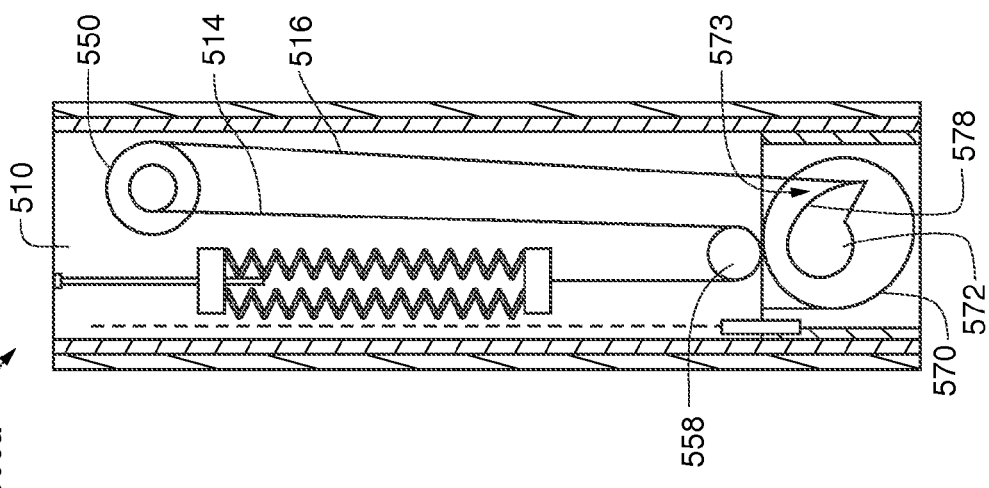

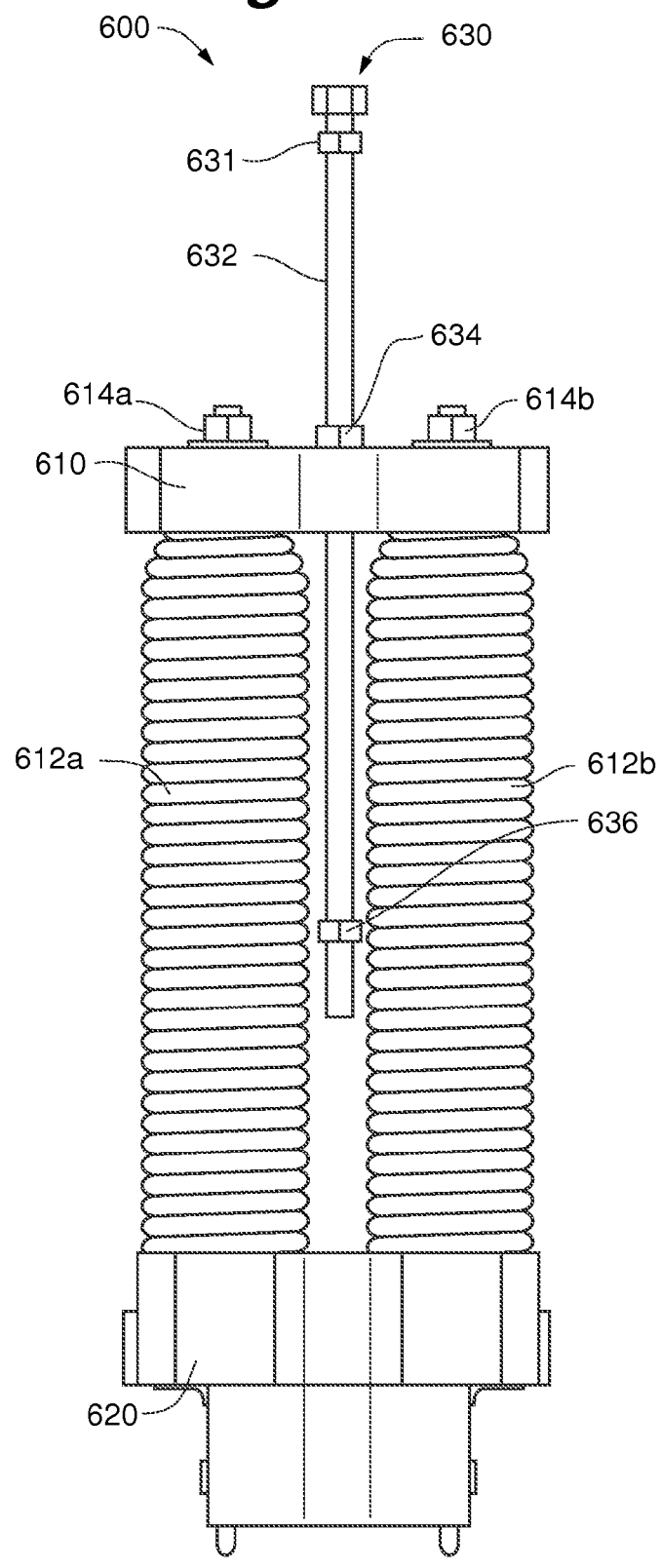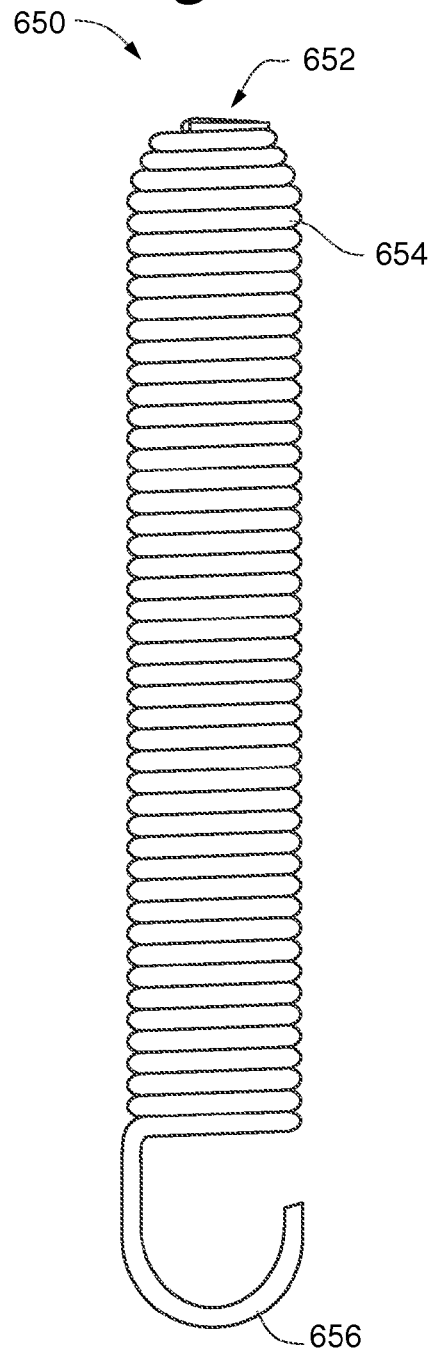

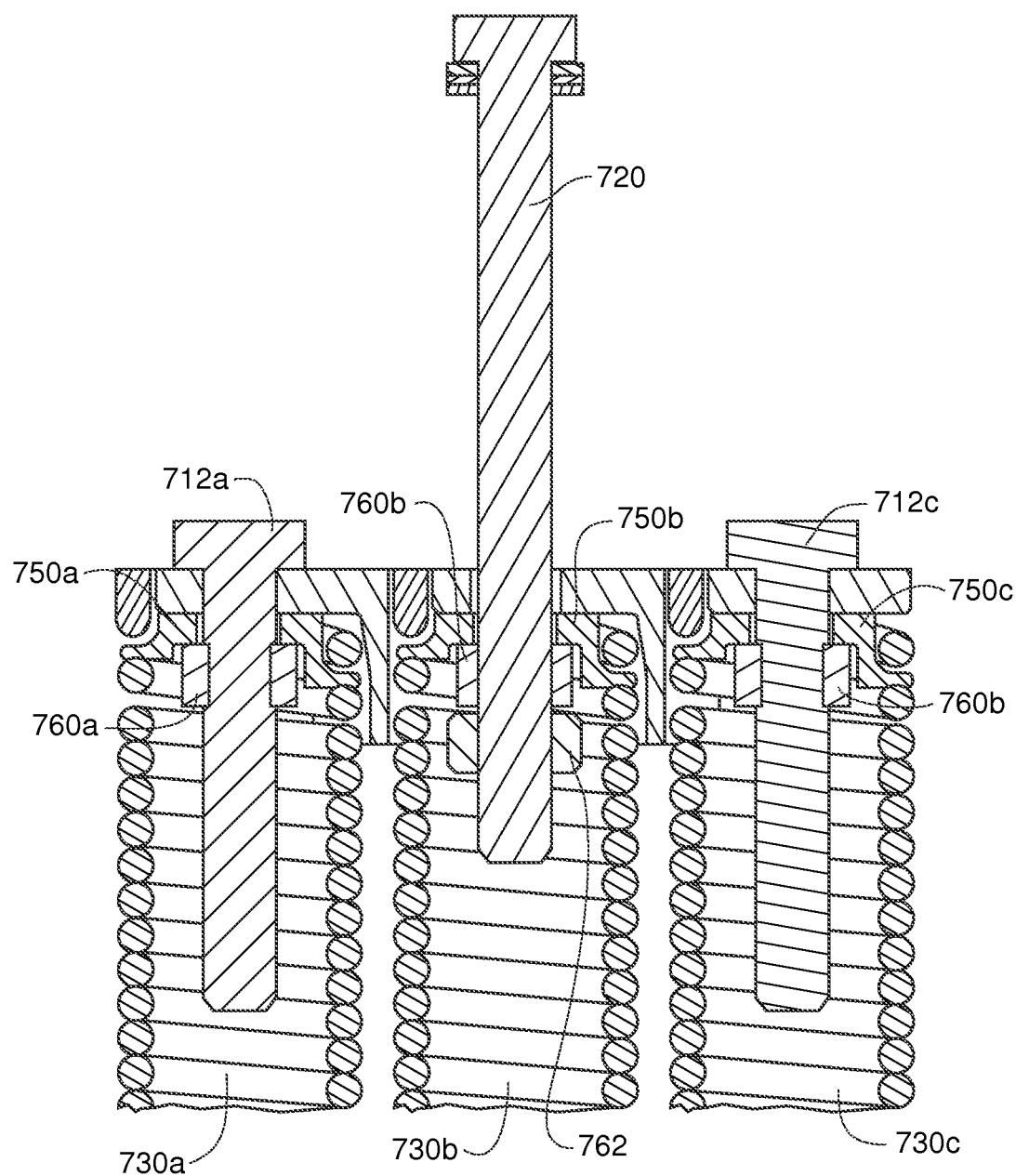

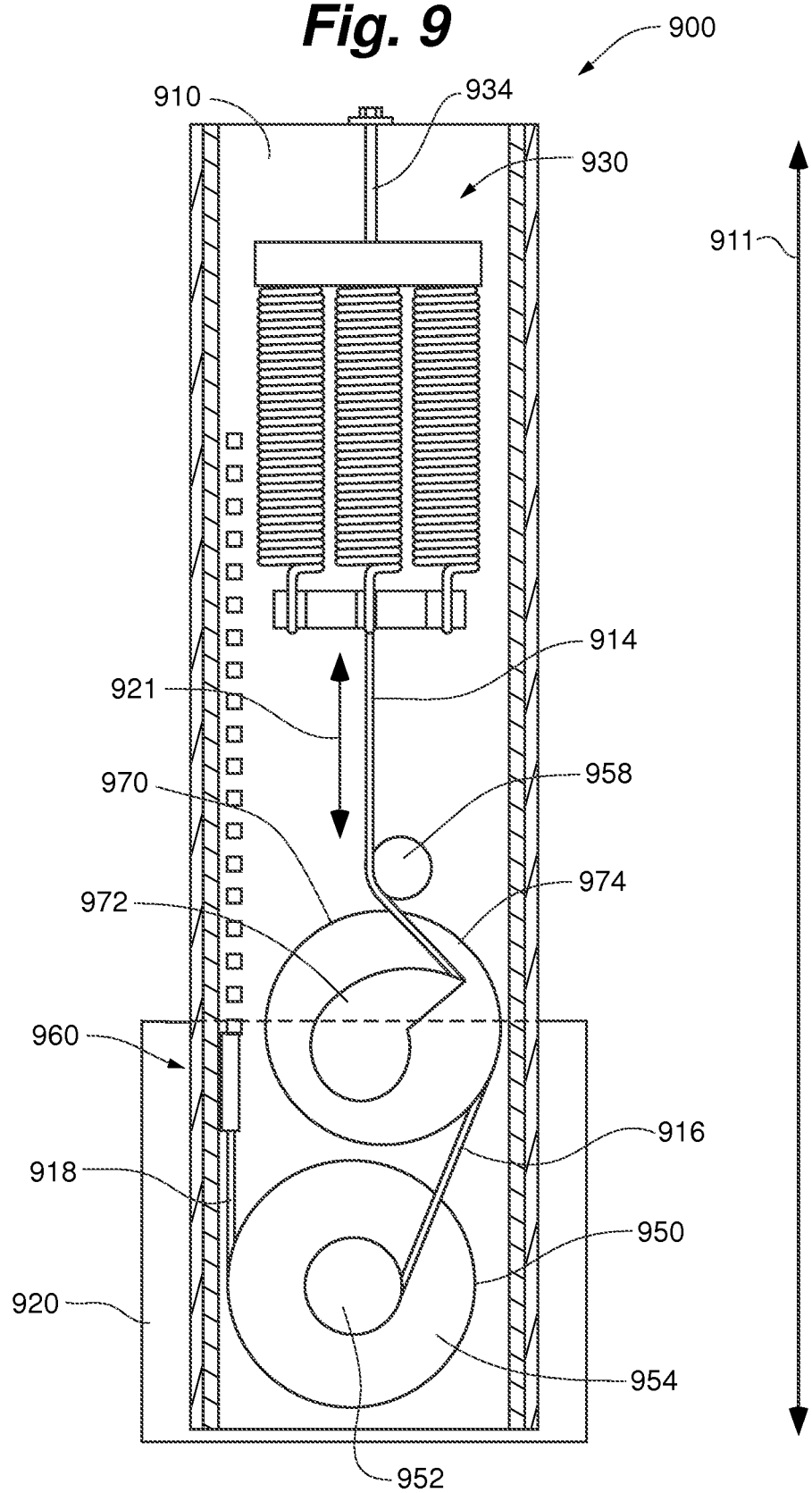

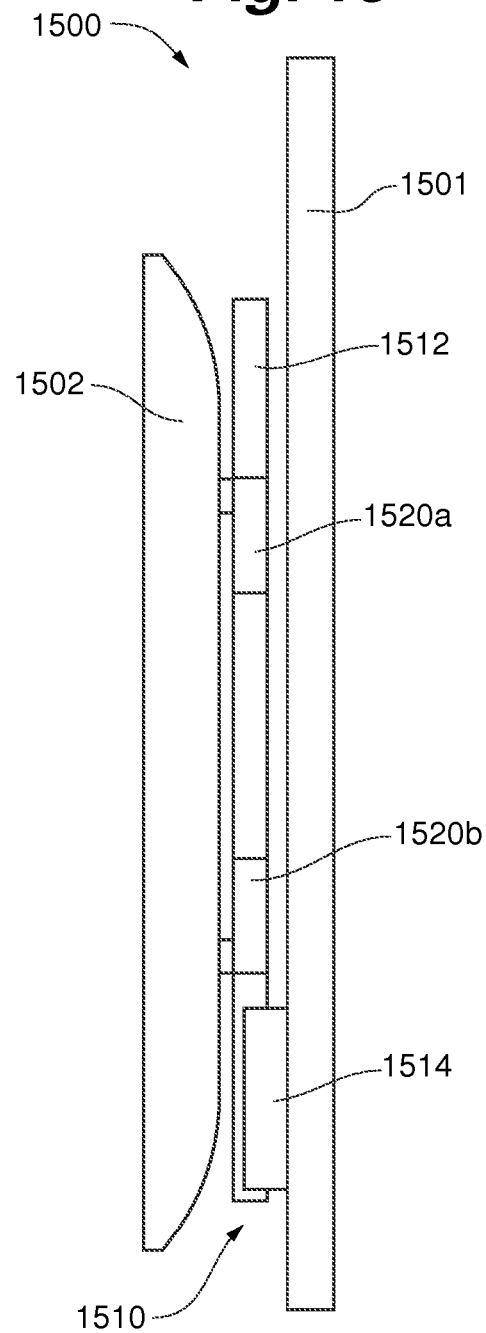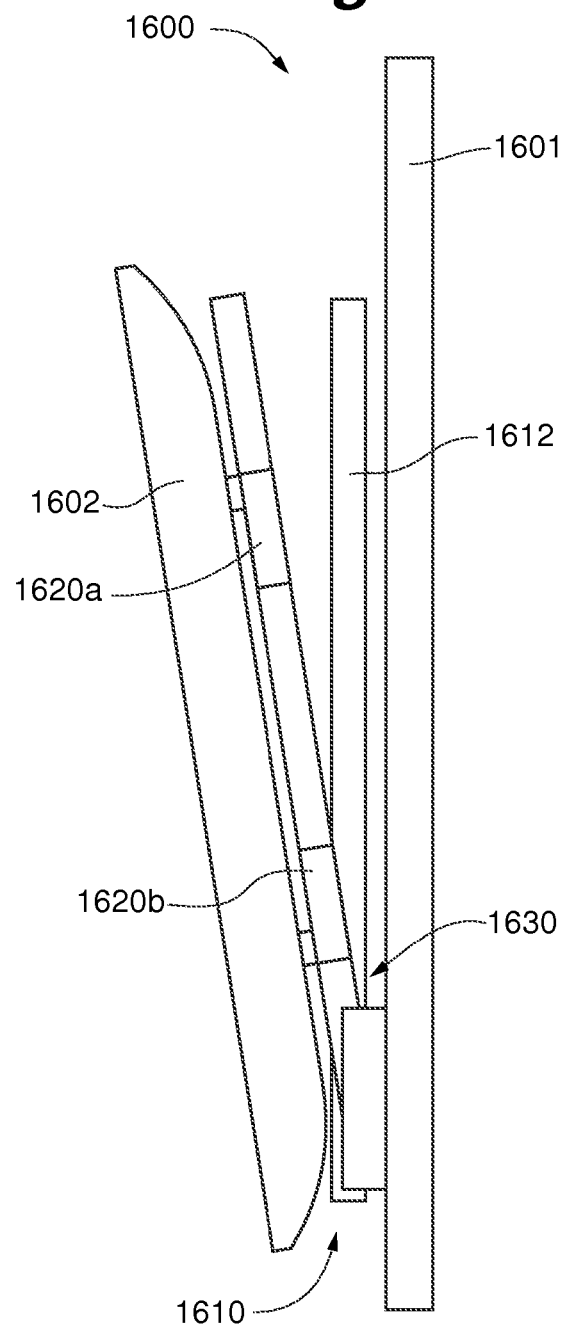

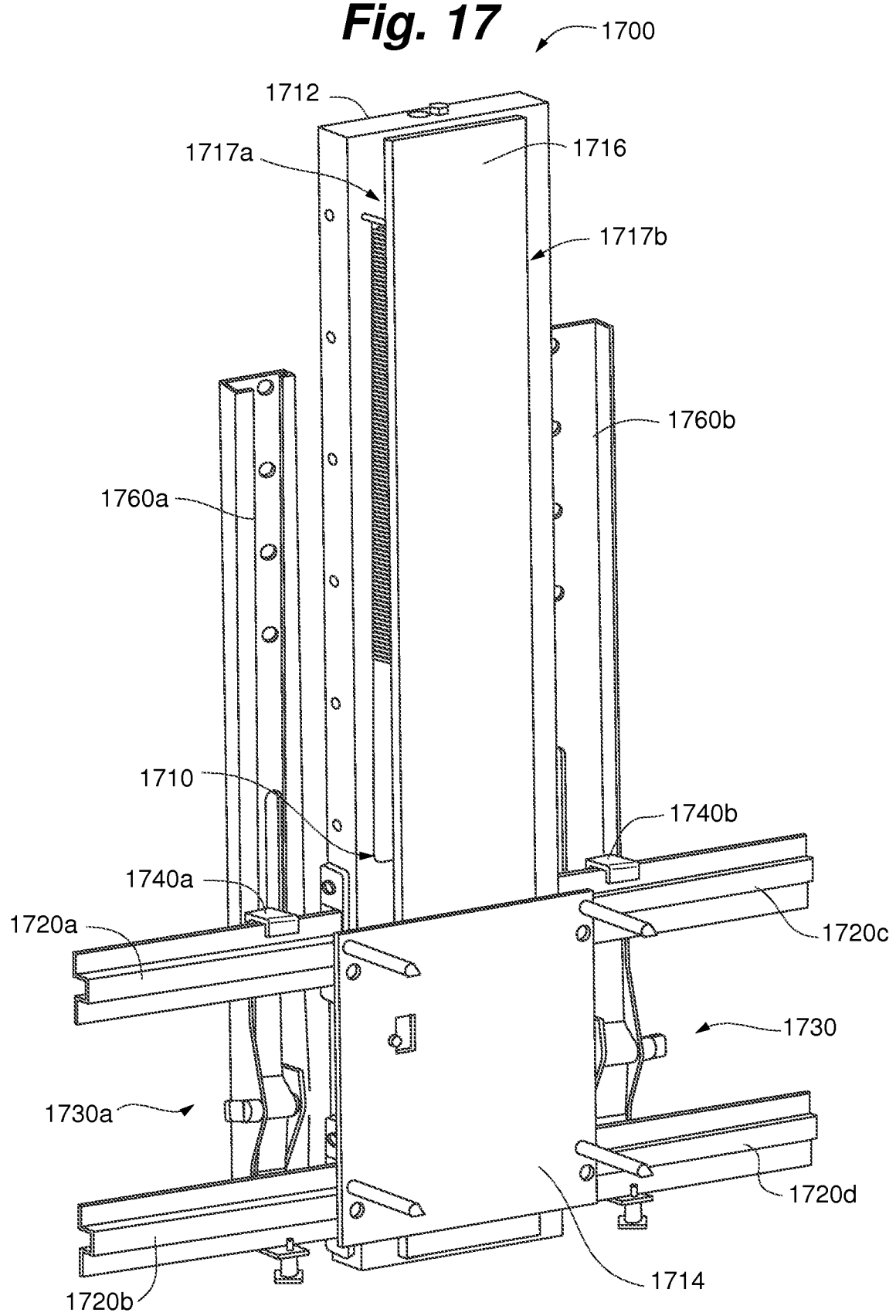

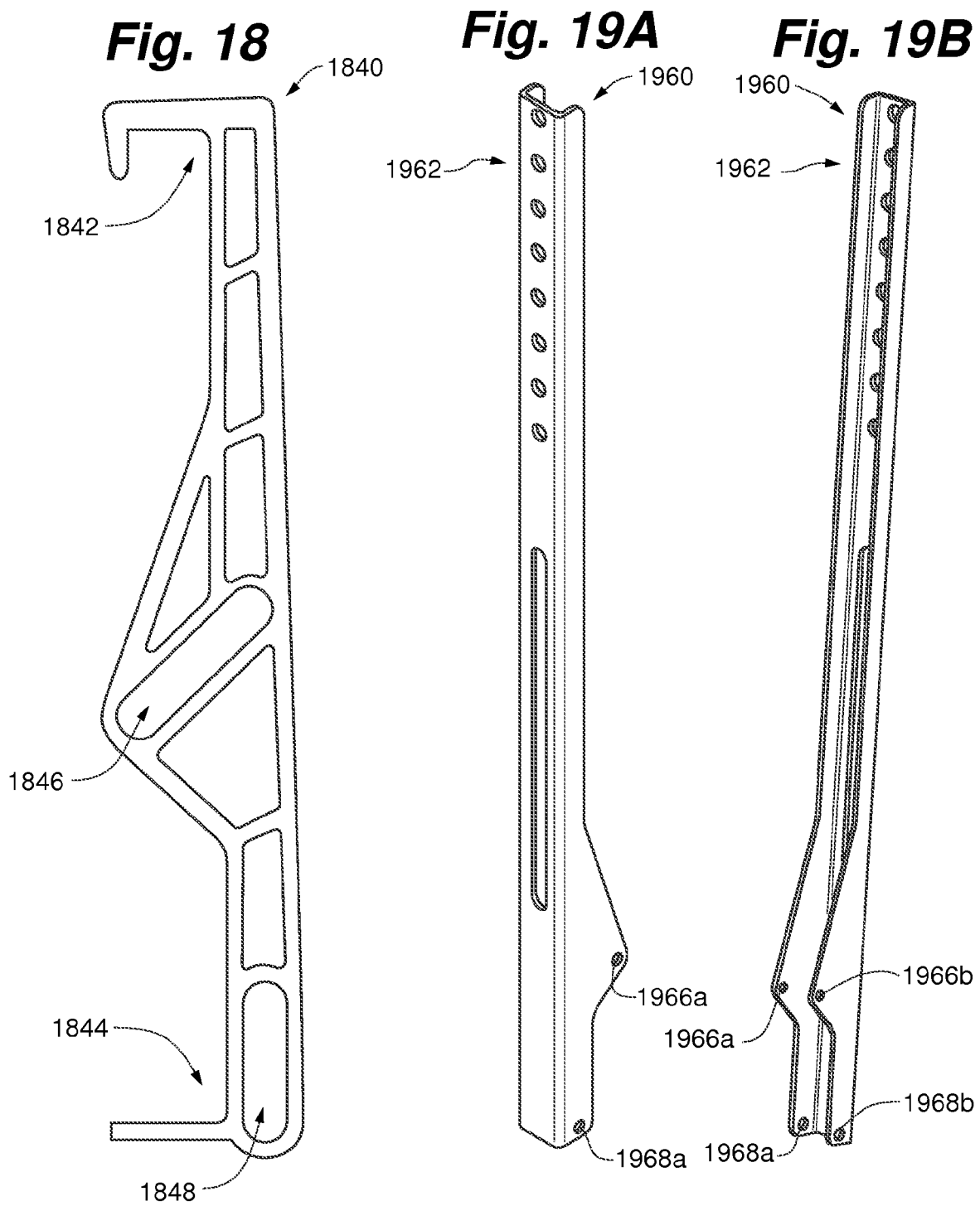

Fig. 20A
Fig. 20B
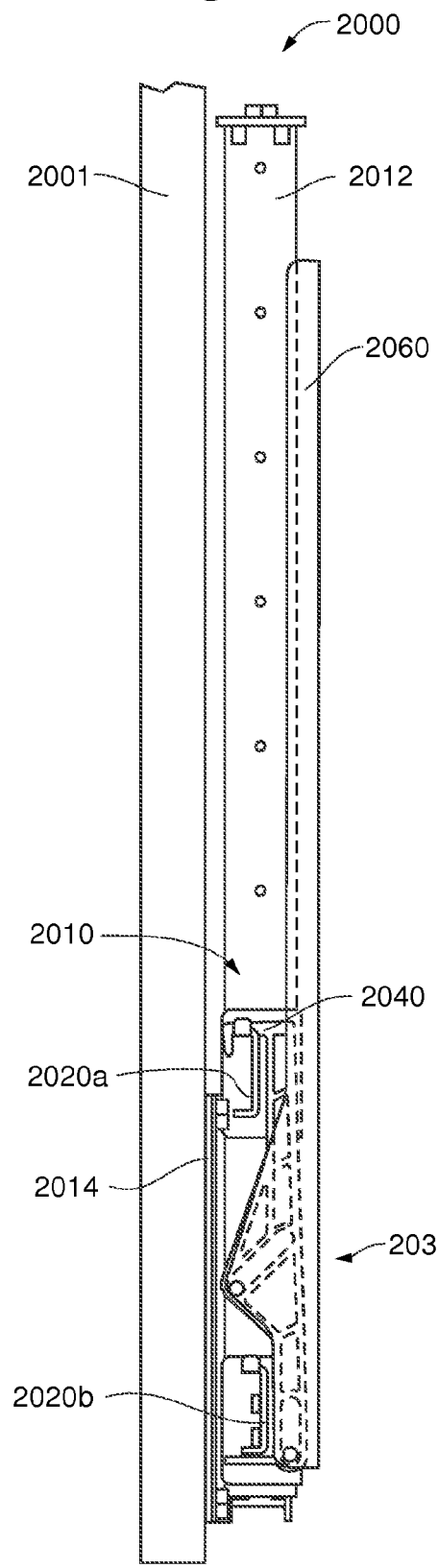
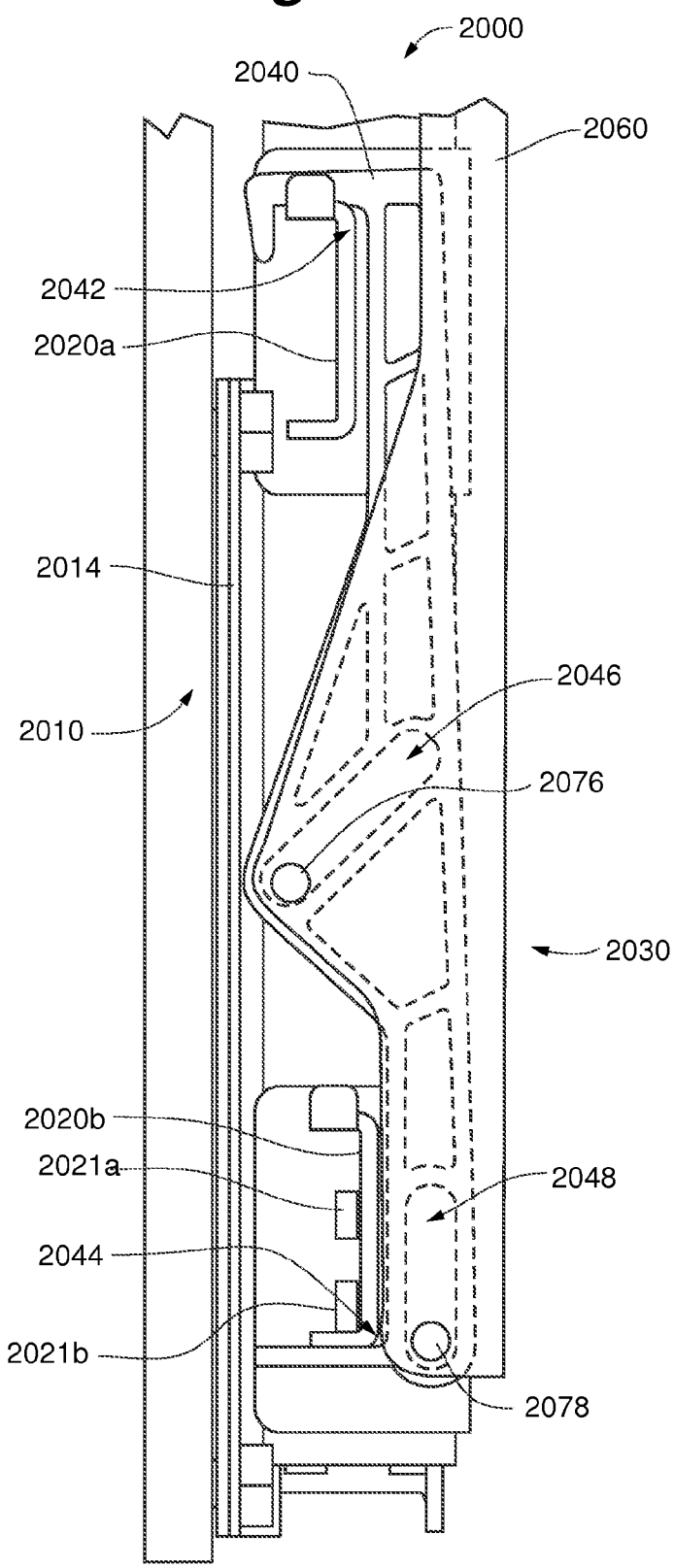

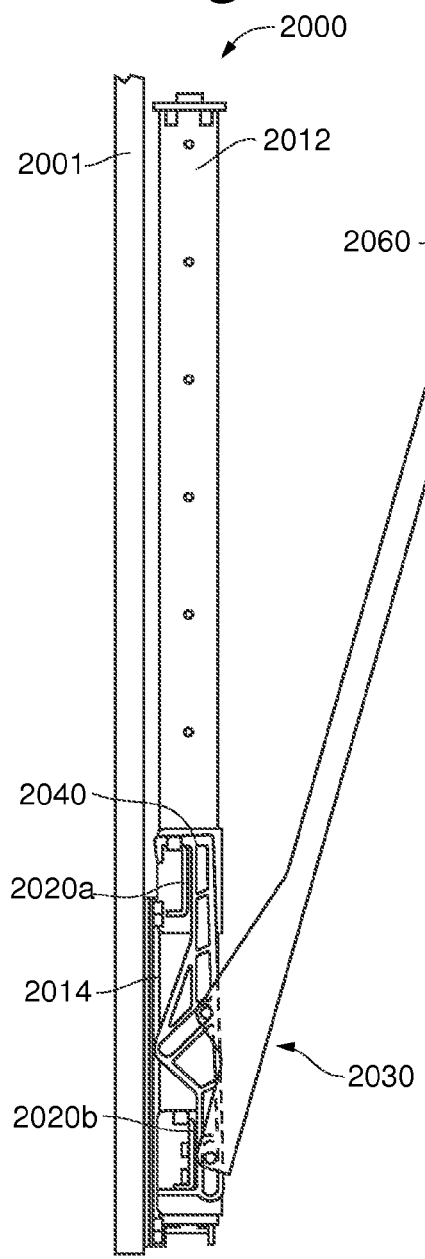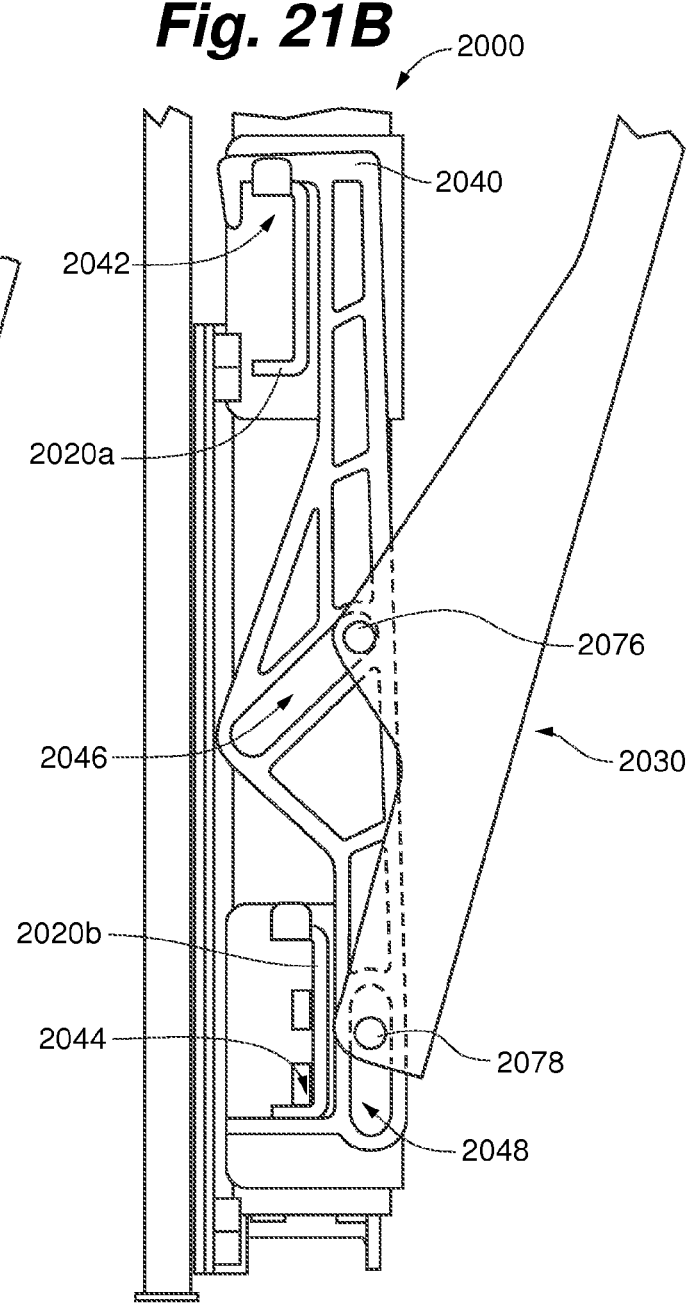

Fig. 23A
Fig. 23B
Fig. 23C
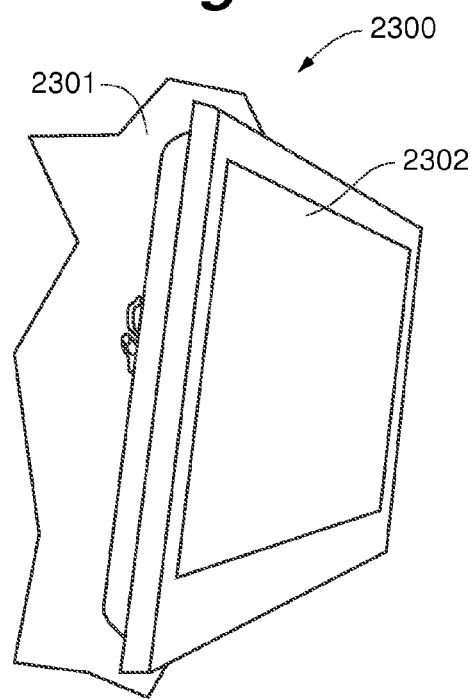
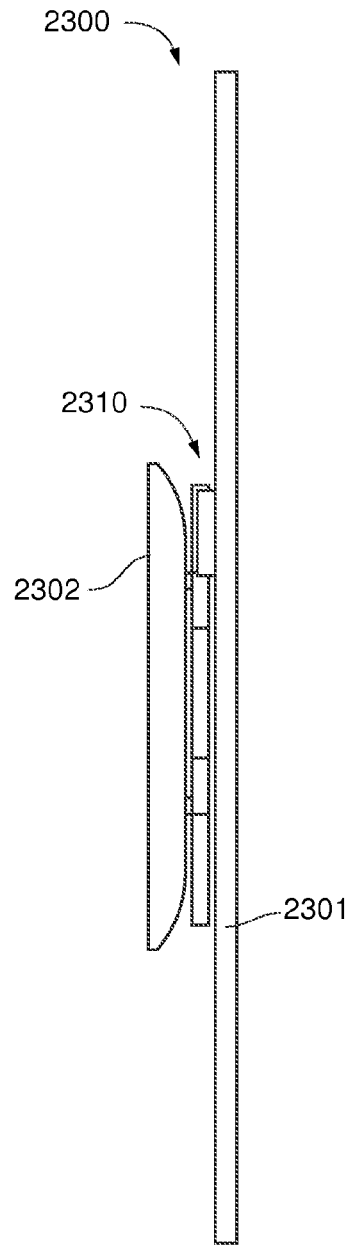
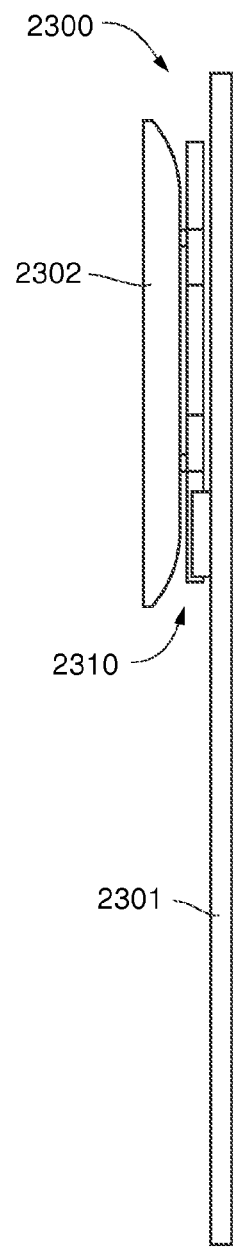

Fig. 25A
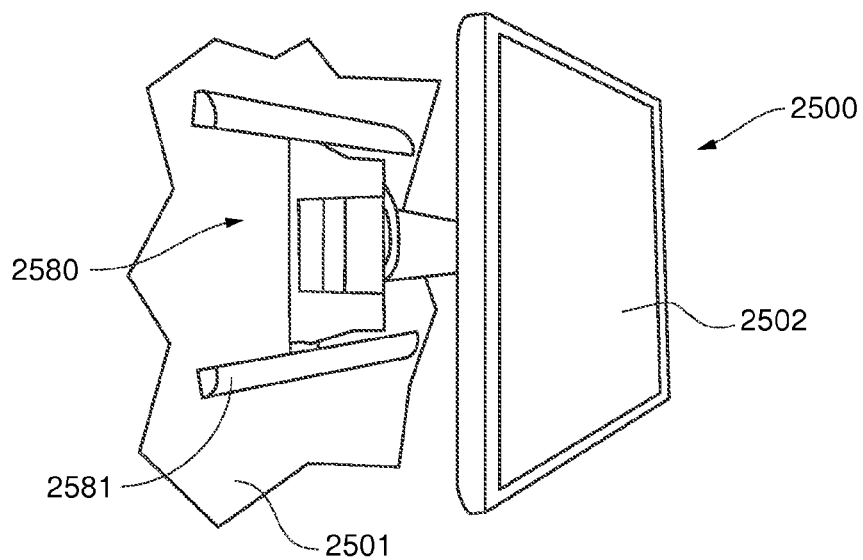
Fig. 25B
Fig. 25C
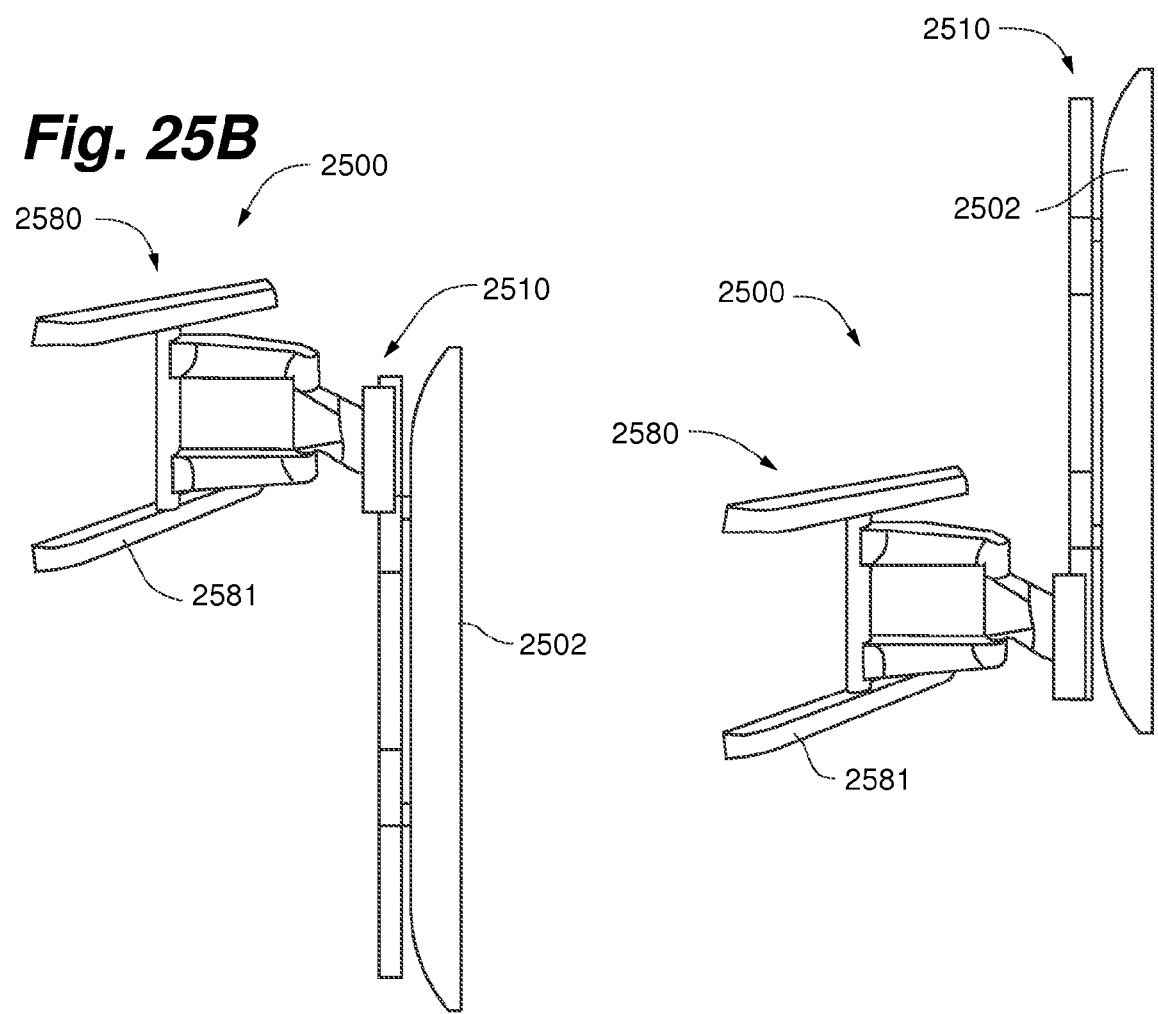

COUNTERBALANCING LIFT MECHANISMS AND METHODS

CROSS-REFERENCES

This application claims the benefit of U.S. Provisional Application No. 61/618,138, filed Mar. 30, 2012, the content of which is hereby incorporated by reference in its entirety.

FIELD

Embodiments of the invention generally relate to an apparatus for lifting and balancing a load.

BACKGROUND

Electronic displays, such as, for example, computer monitors, tablets, televisions, and the like, are employed in a variety of settings. In some settings, one electronic display may be used by multiple operators. For example, a computer monitor may be deployed in a workplace that is shared by multiple employees. In another example, a television may be deployed in a conference center where many individuals use the display throughout the day. It can be appreciated that differences in people's size and preferences may call for a shared electronic display to be adjustable to accommodate the individual preferences of the users. For instance, a child would have different physical space needs than an adult using the same computer and monitor. In some situations, an electronic display that is dedicated to an individual user may also have a need to be adjusted. For example, a single user may have physical requirements or a preference to periodically sit and stand while using an electronic display. In these situations, an adjustable height mechanism may be used to accommodate the needs of the multiple operators or the single user. Ease of adjustability as well as aesthetic appeal of an adjustable height mechanism may be important considerations for a user.

SUMMARY

Embodiments of the invention are generally directed to devices that can position electronic displays and other loads along a range of travel. In some cases positioning a display can include lifting and/or translating the display with reference to horizontal/vertical reference planes. Positioning a display may also involve countering a weight of the display and portions of the positioning apparatus to assist a user in moving the display.

According to one aspect, a counterbalancing lift mechanism for raising and lowering an electronic display is provided. The lift mechanism generally includes a support bracket configured to be coupled to a support member and a moving bracket configured to be coupled to an electronic display. A sliding mechanism is coupled between the support bracket and the moving bracket and provides the moving bracket with a range of travel relative to the support bracket. The range of travel includes a low position and a high position, which in some cases may be the same as a minimum height and a maximum height.

The lift mechanism also includes a spring assembly mounted to the moving bracket. The spring assembly is configured to generate a first force for countering a second force that corresponds to the weight of an electronic display coupled to the moving bracket. The spring assembly has a first end coupled to the moving bracket and a second end that moves through a range of deflection as the moving bracket moves through the range of travel. A transition assembly is also provided (e.g., mounted to the moving bracket). When the moving bracket moves along the range of travel, the transition assembly is configured to deflect the spring assembly a shorter length than the moving bracket. The lift mechanism also includes a cam assembly (e.g., mounted to the moving bracket) and two or more cables. The cam assembly includes a cam and a wheel. The cables operatively couple the moving bracket to the support bracket in combination with the spring assembly, the transition assembly, and the cam assembly.

According to another aspect, an embodiment provides an electronic display positioning apparatus. The apparatus includes a support bracket, a moving bracket slidingly engaged with the support bracket through a range of travel, and a counterbalancing mechanism mounted to the moving bracket. The support bracket is configured to be coupled to a support structure (e.g., a wall, a riser, an arm, a post, a stand, a base, a surface, etc.), while the moving bracket is configured to be coupled (e.g., directly or indirectly attached) to an electronic display. The moving bracket includes a housing that has a height, a width, and a thickness. The height and the width of the housing are less than a height and a width of an electronic display to be coupled to the moving bracket.

The counterbalancing mechanism of the display positioning apparatus is mounted to the moving bracket within the moving bracket housing. The mechanism is configured to offset a combined weight of the electronic display, the moving bracket, and the counterbalancing mechanism. In general terms, the counterbalancing mechanism includes a spring assembly, a transition assembly, a cam assembly, and a plurality of cables operatively coupling the moving bracket to the support bracket in combination with the spring assembly, the transition assembly, and the cam assembly. The spring assembly further defines a first end that is coupled to the moving bracket and a second end that moves through a range of deflection as the moving bracket moves through the range of travel. The transition assembly is configured to deflect the spring assembly a shorter length than the length of a corresponding movement of the moving bracket along the range of travel. The cam assembly includes a cam and a wheel, which in some cases may be integrally connected or separately provided and rotationally fixed.

According to another aspect, a lift mechanism can be provided for adjusting a height of an electronic display. The lift mechanism includes a first portion configured to be coupled to a support member and a second portion slidingly engaged with the first portion through a range of travel. The second portion is also configured to be coupled to an electronic display. The lift mechanism includes a spring assembly mounted to the second portion that is configured to exert a variable force. The spring assembly has a first end coupled to the second portion and a second end that moves through a range of deflection as the second portion moves through the range of travel. A transition assembly is mounted to the second portion as well. The transition assembly is configured to reduce the variable force and deflect the spring assembly a shorter length than the length of a corresponding movement of the second portion along the range of travel. In addition, the lift mechanism includes a cam assembly having a cam and a wheel mounted to the second portion. The cam assembly is configured to convert the reduced variable force into a substantially constant force and apply the substantially constant force to the first portion. The second portion, the first portion, the spring assembly, the transition assembly and the cam assembly are connected by a plurality of cables.

According to another aspect, a method is provided for positioning an electronic display. The method includes moving an electronic display a first distance through a vertical range of travel relative to a support member. The electronic display is coupled to the support member with a display positioning apparatus that includes a spring assembly, a transition assembly, and a cam assembly. While moving the electronic display, the method also includes moving the spring assembly, the transition assembly, and the cam assembly the first distance through the vertical range of travel and deflecting the spring assembly a second distance through a range of deflection, the second distance corresponding to the first distance. The second distance is also less than the first distance. The method also includes generating a first variable force with the spring assembly while deflecting the spring assembly the second distance through the range of deflection, generating a reduced force with the transition assembly, the reduced force corresponding to the first variable force, generating a substantially constant force with the cam assembly, and the substantially constant force corresponding to the first variable force. In some cases the method includes applying the reduced force to the support member to counter a weight of the electronic display. In some cases, the method includes applying the substantially constant force to the support member to counter the weight of the electronic display.

Some embodiments may optionally provide none, some, or all of the following advantages, though other advantages not listed here may also be provided.

In some cases, a counterbalancing lift mechanism may include a transition assembly that includes a transition pulley assembly. The transition pulley assembly includes a first and second transition pulleys and is configured to reduce a first force generated by the spring assembly. In some cases a braking assembly is also provided. The braking assembly may be configured to lock the movement of support and moving brackets relative to each other. The moving bracket can further include a plurality of slots positioned on the moving bracket in alignment with the braking assembly on the support bracket, so that the slots pass by the braking assembly as the moving bracket is moved relative to the support bracket. In some cases the braking assembly includes an axle, a braking latch and a brake spring. The braking latch is configured to pivotally support the axle and engage with the plurality of slots. The brake spring is configured to bias the braking latch toward engagement with the plurality of slots. In some embodiments at least one of the plurality of cables is coupled to the braking latch to provide a tension opposing the bias of the brake spring to disengage the braking latch from the plurality of slots.

In some cases positioning an electronic display involves simultaneously performing a number of actions in concert. For example, in some cases a method involves moving an electronic display within a range of travel, and while moving the display, providing a first variable force with an energy storage assembly, reducing the first variable force with a transition pulley assembly, converting the reduced first variable force into a second constant force with a cam assembly, and assisting the positioning of the device with the second constant force, which offsets the gravitational force exerted by the collective weight of the electronic display, the energy storage assembly, the transition pulley assembly, and the cam assembly.

In some cases the extent of the range of travel of a moving bracket can be longer than the range of deflection provided for a spring assembly. For example, in some cases a moving bracket's range of travel is between about two and about five times longer than the spring assembly's range of deflection.

In some cases the range of travel is at least about three times longer than the range of deflection. In some embodiments the transition assembly includes a first transition pulley rotationally fixed with a second transition pulley. The pulleys are configured to provide a first travel multiplier for transitioning between deflections of the spring assembly and corresponding movements of the moving bracket. In some cases the first travel multiplier is at least about two. In addition, or as an alternative, in some cases the cam assembly optionally provides a second travel multiplier for transitioning between deflections of the spring assembly and corresponding movements of the moving bracket.

In some cases a lift mechanism and/or display positioning apparatus includes at least one threading element for assisting in securing a spring of the mechanism/apparatus. The threading element includes a fastener section configured to attach the threading element to a spring guide bracket, the moving bracket, or another structure, and also includes a core section configured to position the threading element within a diameter of a spring. The threading element also includes a threading section configured to engage the spring between at least two coils of the spring.

According to some embodiments, a lift mechanism or other device including a moving bracket may also include a tilt mechanism, rotation mechanism, or other mechanical linkage coupling the moving bracket to the electronic display. In some cases a display positioning apparatus includes a tilt mechanism that has a support bracket mounted to the moving bracket, a display mounting bracket configured to attach to the electronic display, and a tilt bracket coupled between the tilt mechanism support bracket and the display mounting bracket. In some cases the tilt bracket is configured to provide the display mounting bracket with a range of tilt.

These and various other features and advantages will be apparent from a reading of the following detailed description.

BRIEF DESCRIPTION OF THE DRAWINGS

The following drawings illustrate some particular embodiments of the present invention and therefore do not limit the scope of the invention. The drawings are not to scale (unless so stated) and are intended for use in conjunction with the explanations in the following detailed description. Some embodiments will hereinafter be described in conjunction with the appended drawings, wherein like numerals denote like elements.

FIG. 1 is an elevation view of a lift mechanism in accordance with an embodiment with one or more portions rendered transparent for clarity.

FIGS. 2A-2B are top plan views of a lift mechanism separately showing a cam assembly and a transition assembly, respectively, in accordance with an embodiment.

FIG. 2C is a combined top plan view of FIGS. 2A and 2B, illustrating the lift mechanism of FIGS. 2A-2B including a spring assembly and showing both the cam assembly and the transition assembly.

FIG. 3B-3E are elevation views of the lift mechanism of FIG. 3A in various positions with one or more portions rendered transparent for clarity.

FIGS. 5A-5C elevation views of lift mechanisms in accordance with some embodiments with one or more portions rendered transparent for clarity.

FIG. 6A is a front plan view of a spring assembly in accordance with an embodiment.

FIG. 6B is a front plan view of a spring in accordance with an embodiment.

FIG. 8 is a partial cross-sectional view of the spring assembly of FIG. 7A.

FIG. 9 is an elevation view of a lift mechanism in accordance with an embodiment with one or more portions rendered transparent for clarity.

FIG. 15 is an elevation view of a display coupled to a display positioning apparatus in accordance with an embodiment.

FIG. 16 is an elevation view of a display coupled to a display positioning apparatus in accordance with an embodiment.

FIG. 17 is a perspective view of a display positioning apparatus in accordance with an embodiment.

FIG. 18 is an elevation view of a tilt bracket in accordance with an embodiment.

FIGS. 19A and 19B are perspective views of a display mounting bracket in accordance with an embodiment.

FIG. 20A is a side view of a positioning apparatus in accordance with an embodiment with one or more portions rendered transparent for clarity.

FIG. 20B is an elevation view of a bottom portion of the positioning apparatus of FIG. 20A with one or more portions rendered transparent for clarity.

FIG. 21A is an elevation view of the positioning apparatus of FIG. 20A in a tilted position in accordance with an embodiment with one or more portions rendered transparent for clarity.

FIG. 21B is an elevation view of the positioning apparatus of FIG. 20A in a tilted position in accordance with an embodiment with one or more portions rendered transparent for clarity.

FIG. 23A is a perspective view of a display and positioning apparatus in accordance with an embodiment.

FIGS. 23B and 23C are schematic elevation views of the display and positioning apparatus of FIG. 23A.

FIG. 25A is a perspective view of a display and positioning apparatus in accordance with an embodiment.

FIGS. 25B and 25C are schematic elevation views of the display and positioning apparatus of FIG. 25A.

DETAILED DESCRIPTION

Figure 3A:
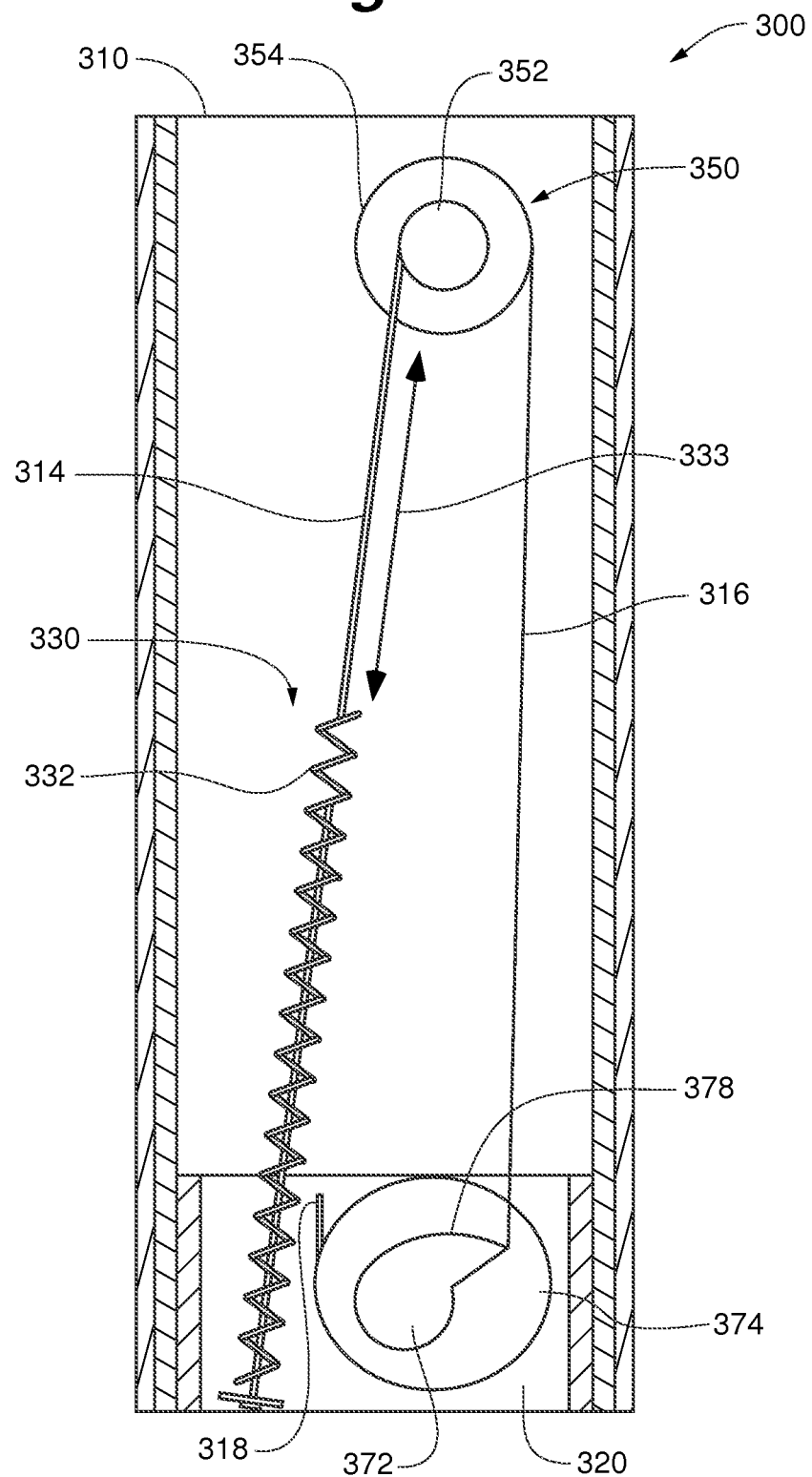
FIG. 3A is an elevation view of a lift mechanism in accordance with an embodiment with one or more portions rendered transparent for clarity.

The following detailed description is exemplary in nature and is not intended to limit the scope, applicability, or configuration of the invention in any way. Rather, the following description provides some practical illustrations for implementing some embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Certain embodiments of the invention are directed to mechanisms and systems for lifting, supporting, balancing, and/or positioning a load along a range of travel. In some cases, the range of travel includes a vertical portion (e.g., substantially vertical or vertical and horizontal) with respect to a support surface or operator, providing a height-adjustable load positioning apparatus. As discussed further herein, certain embodiments are adapted for positioning and supporting an electronic display. As used herein, the term electronic display is used to refer to televisions, computer monitors, tablet computers, smart phones and other types of displays or devices incorporating displays capable of displaying images from electronic signals. For example, certain embodiments provide a positioning apparatus that allows a user to position an electronic display along a range of travel of the positioning apparatus. In some cases, a positioning apparatus may include a lift mechanism that provides a display with a range of vertical travel and/or a balance mechanism that can support a display and assist a user in positioning the display against its weight. Embodiments discussed herein provide several examples of lift mechanisms and positioning apparatuses incorporating balance mechanisms that are capable of positioning a display. However, it is contemplated that embodiments of the invention can be used for positioning a wide variety of items and the scope of the invention is not limited in this regard.

FIG. 1 is an elevation view of a lift mechanism 100 in accordance with an embodiment with one or more portions rendered transparent for clarity. Lift mechanism 100 generally includes a movable portion 106 that is movably coupled to a fixed portion 108 of lift mechanism 100. The fixed portion 108 can be configured to be attached (directly or indirectly) to a support structure, for example a wall or a base, and movable portion 106 may be coupled (e.g., directly or indirectly) to a load such as an electronic display. Thus, in some embodiments a display positioning apparatus including lift mechanism 100 may translate an electronic display relative to a support structure by translating a movable portion of the lift mechanism relative to a fixed portion of the lift mechanism.

According to some embodiments, the movable portion 106 of lift mechanism 100 is provided as a moving bracket 110, and the fixed portion 108 is provided in the form of support bracket 120 configured to be attached (e.g., directly or indirectly) to a support surface or support member. In some cases the moving bracket 110 includes a first surface or panel (e.g., of a housing) covering the entire back of bracket 110 between the moving bracket and support bracket 120. The first surface is left transparent in the view of FIG. 1 to provide a clearer view of support bracket 120. In addition, in some cases moving bracket 110 includes a second surface or panel covering the opposite side of moving bracket 110, opposite from support bracket 120. The second surface is also left transparent in FIG. 1 to provide an unobstructed view of several components that will now be described.

Lift mechanism also includes spring assembly 130, transition assembly 149, and cam assembly 170. Lift mechanism 100 may be useful for lifting a variety of loads, including electronic displays, and may be incorporated into a display positioning apparatus or other device. In an example where lift mechanism 100 is incorporated into a positioning apparatus, moving bracket 110 and support bracket 120 may form a riser that provides a positioning apparatus with a vertical range of adjustability.

Moving bracket 110 and support bracket 120 may be disposed in sliding engagement with one another such that moving bracket 110 may translate with respect to support bracket 120. For example, a sliding mechanism may be coupled between the support bracket and the moving bracket to provide the moving bracket with a range of travel 111 relative to the support bracket. In some cases the range of travel 111 includes a high position (shown in FIG. 1) and a low position (not shown) along the range. For example, the high position may be the maximum height that the moving bracket can assume. Similarly, the low position may be the minimum height that the moving bracket may assume. As shown in FIG. 1 and throughout the figures, a range of travel 111 is illustrated with reference to the top end of the moving bracket 110, thus indicating the range of travel for the top of the moving bracket. Of course it should be appreciated that the range of travel can be depicted with respect to other points of reference, or may refer to a combined range of travel of multiple points on the moving bracket (e.g., from the highest position of the moving bracket top to the lowest position of the moving bracket bottom).

As shown in FIG. 1, two sliding mechanisms include sliding elements 112*a* and 112*b* mounted to the moving bracket that are configured to engage with sliding elements 122*a* and 122*b* attached to support bracket 120, respectively. In another example, the support bracket may include rails, and the moving bracket may include wheels configured to roll along the rails. One skilled in the art will appreciate that any suitable engagement mechanism may be used to provide a sliding engagement between the movable and support brackets of lift mechanism 100.

Support bracket 120 may be fixed to a support structure, for example a wall or a base, and moving bracket 110 may be coupled (e.g., directly or indirectly) to a load such as an electronic display. Accordingly, a positioning apparatus incorporating lift mechanism 100 may translate an electronic display relative to a support structure by translating moving bracket 110 relative to support bracket 120. FIGS. 14-17, 20A-26C, which are described further herein, provide examples of lift mechanisms and positioning apparatuses that incorporate a balance mechanism.

As shown in FIG. 1, spring assembly 130 is configured to provide a balancing force between moving bracket 110 and support bracket 120 to offset the weight of moving bracket 110 and any load coupled thereto. In this example, spring assembly 130 includes spring 132 and adjustment mechanism 134. In some embodiments, spring 132 includes an extension spring. Moving bracket 110 is coupled to spring 132, which is coupled to transition assembly 149 by cable 114. Spring 132 exerts a pull force on cable 114 as it moves through a range of deflection 133 and is configured to provide a force that counters or offsets the weight of moving bracket 110 and any display or other equipment coupled thereto. Adjustment mechanism 134 couples spring 132 to moving bracket 110 and is configured to adjust the tension of spring 132. For example, adjustment mechanism may be a threaded bolt with a bracket that changes the effective rest length of spring 132 when actuated. Additional examples of a spring assembly will be discussed further with respect to FIGS. 6A-8. While FIG. 1 shows an embodiment in which spring assembly 130 includes spring 132, it should be appreciated that in some cases a spring assembly may incorporate other types of suitable energy storage mechanism to provide a balancing force between moving bracket 110 and support bracket 120.

Continuing with reference to FIG. 1, in this embodiment transition assembly 149 is provided as a multilevel pulley. Embodiments described herein provide a transition assembly 149 in the form of a multilevel pulley 150 referred to herein for convenience as a transition pulley assembly 150. While several embodiments are described in terms of the example of transition pulley assembly 150, it should be appreciated that a multilevel pulley is only one possible example of a transition assembly 149 and other embodiments are possible.

Returning to FIG. 1, transition pulley assembly 150 can be coupled to moving bracket 110 and includes first and second transition pulleys 152 and 154. In this example, the radius of first transition pulley 152 may be less than the radius of second transition pulley 154. First transition pulley 152 is also rotationally fixed with respect to second transition pulley 154. In this embodiment first transition pulley 152 is rotationally fixed, and concentric, to second transition pulley 154. Accordingly, rotation of the transition pulleys is synchronized such that one full rotation of first transition pulley 152 corresponds with one full rotation of second transition pulley 154. In certain examples, first transition pulley 152 and second transition pulley 154 may be connected directly together by an axle, integrally formed or separated by a distance when installed. In the illustrated embodiment, first transition pulley 152 is coupled to spring assembly 130 by cable 114, and second transition pulley 154 is coupled to cam assembly 170 by cable 116.

Cam assembly 170 can also be coupled to moving bracket 110 and can include cam 172 and wheel 174. In the embodiment shown, cam 172 includes attachment post 176 and camming surface 178. In this example, an end of cable 116 is attached near the tip 176 of cam 172. Accordingly, when cam assembly 170 is rotated counter-clockwise, cable 116 winds along camming surface 178. Cam 172 is rotationally fixed with respect to wheel 174 such that cam 172 rotates along with wheel 174. Cam 172 and wheel 174 may be connected directly together through an axle, integrally formed, or separated by a distance when installed. Cam 172 can be coupled to transition pulley assembly 150 by cable 116 and wheel 174 can be coupled to support bracket 120 by cable 118.

According to some embodiments, spring 132 may not exert a constant linear force on cable 114. Instead, spring 132 may exert a linear force that varies with the amount of deflection (i.e., extension or contraction) of the spring along the range of deflection 133. It may be desirable in some examples, however, to provide a relatively constant lifting force to assist in the translation of moving bracket 110, as a constant force tends to make adjustment of a lift mechanism easier and more ergonomically-friendly for operators. In some examples, cam 172 may be shaped and positioned to convert the variable force of spring 132 into a substantially constant torque force on wheel 174. For example, camming surface 178 may be configured to decrease the effective radius of cam 172 as the cam is rotated. Referencing FIG. 1, when cam 172 is rotated counter-clockwise the effective radius of the cam relative to cable 116 is reduced. Wheel 174 then relays the constant torque to cable 118 thereby creating a constant linear force to balance or assist in translating moving bracket 110 relative to support bracket 120. To provide a desirable force matching profile, the rate at which cam 172 varies its effective radius should correspond with the rate at which the contracting force of spring 132 varies as it is deflected.

Cables 114, 116 and 118 are configured to transmit forces between moving bracket 110 and support bracket 120. Cables 114, 116 and 118 may be formed of any material known in the art suitable for the desired application (e.g., natural fibers, metal, polymer, single-strand, cable). In some embodiments, to further provide high reliability over a long life at a relatively low cost, the cables may be produced from materials including high tensile strength polymers. Such tensile polymers provide greater reliability over a longer useful life than would metal cables. For example, a typical computer lift mechanism built with a steel cable may break in less than 500 cycles, while an engineered polymer fiber line may exceed 10,000 cycles. Polymeric fibers may comprise, for example, aromatic polyester liquid crystal polymers, amid fibers, or other high tensile strength synthetic fibers woven into a rope configuration. It should be appreciated that while the examples herein are described as using cables, the term cable is used broadly to mean any suitable elongated tension member. For example, any one of the disclosed cables could be provided as various types of tension members, including, for example, a line, cord, string, rope, chain, ribbon, belt, or another such member known in the art.

Accordingly, moving bracket 110 is operatively coupled to support bracket 120 by cables 114, 116 and 118 through or in combination with spring assembly 130, transition pulley assembly 150 and cam assembly 170. Generally, lift mechanism 100 provides a balancing force using spring 132 through the transmission, amplification/reducing, and redirection of force through transition pulley assembly 150 and cam assembly 170. Referencing FIG. 1, spring 132 applies a downward force to cable 114 which applies a counter-clockwise torque across transition pulley assembly 170. This in turn applies a clockwise torque across cam assembly 170 which applies a downward linear force on cable 118. Concurrently, the weight of moving bracket 110, as well as any load coupled thereto, applies an upward linear force to cable 118 which applies a counter-clockwise torque to cam assembly 170. This in turn applies a clockwise torque across transition pulley assembly 150 which applies an upward linear force on cable 114. The weight of moving bracket 110, as well as any load coupled thereto, is offset when the torque forces across transition pulley assembly 150 and cam assembly 170 are in equilibrium (e.g., equal in magnitude and opposite in direction). Thus, lift mechanism 100 may provide a balancing force between moving bracket 110 and support bracket 120 such that an operator may position equipment attached to moving bracket 110 at any desired height along a range of travel 111, having only to overcome the friction of the system, provided, for example, by the sliding engagement between moving bracket 110 and support bracket 120. Further, because of the balancing force provided by the lift mechanism, the mounting portion will hold its set position without the operator having to engage any locks (though optional locks may be provided).

Translation of moving bracket 110 relative to support bracket 120 may cause a deflection of spring 132. For example, FIG. 1 shows lift mechanism 100 positioned at a peak of a vertical range of motion 111 of the lift mechanism. When moving bracket 110 is translated down relative to support bracket 120 (e.g., by increasing the weight on moving bracket 110 or pulling down on moving bracket 110), the force of the downward translation breaks the equilibrium of forces across moving bracket 110 and support bracket 120 and creates an upward pull force on cable 118 greater than the downward pull force exerted by spring 132 on cable 114. Accordingly, the upward pull force on cable 118 causes cam assembly 170 to rotate clockwise which unwinds cable 118 from wheel 174 and causes cam 172 to wind in cable 116 along cam surface 178. This in turn causes transition pulley assembly 150 to rotate clockwise which unwinds cable 116 from second transition pulley 154 and causes first transition pulley 152 to wind in cable 114 to stretch out spring 132.

Conversely, when moving bracket 110 is translated up relative to support bracket 120 (e.g., by decreasing the weight on moving bracket 110 or lifting up on moving bracket 110), the force of the upward translation breaks the equilibrium of forces across moving bracket 110 and support bracket 120 and allows spring 132 to contract creating a downward pull force on cable 114. Accordingly, the downward pull force on cable 114 causes transition pulley assembly 150 to rotate counter-clockwise which unwinds cable 114 from first transition pulley 152 and causes second transition pulley 154 to wind in cable 116. This in turn causes cam assembly 170 to rotate clockwise which unwinds cable 116 from cam 172 and causes wheel 174 to wind in cable 118. FIGS. 3B-3E and 10A-10B illustrate some examples of translating a moving bracket relative to a support bracket.

As noted above, transition pulley assembly 150 and cam assembly 170 may be configured to transition between forces, including by amplifying and reducing forces. For example, cam assembly 170 may be configured to provide a transition between forces on cable 116 and cable 118 in that it is configured to reduce the pull force on cable 116 and amplify the pull force on cable 118. More specifically, an upward force on cable 116 pulls on cam 172 and creates a clockwise torque across cam assembly 170. The clockwise torque may be balanced with a counter-clockwise torque generated by an upward force on cable 118 exerted on wheel 174. Because the radius of wheel 174 is larger than the effective radius of cam 172, an offsetting counter-clockwise torque may be generated by an upward force on cable 118 that is less than the upward force on cable 116. Accordingly, cam assembly 170 reduces the upward force on cable 116 and amplifies the upward force on cable 118. In some cases the ratio of the radius of wheel 174 and the effective radius of cam 172 may be modified to increase or decrease the amplification/reducing effect of cam assembly 170. In some cases ratio of the wheel radius to cam radius may be considered a force multiplier and/or force reducer.

Similarly, transition pulley assembly 150 may also be configured to provide a transition between forces on cables 114 and 116. For example, transition pulley assembly 150 can reduce the contracting force of spring assembly 130 and amplify the downward pull force from cable 116. More specifically, the downward force exerted by cable 114 pulls on first transition pulley 152 and creates a counter-clockwise torque across transition pulley assembly 150. The counter-clockwise torque may be balanced with a clockwise torque generated by a downward force from cable 116 exerted on second transition pulley 154. Because the radius of second transition pulley 154 is larger than the radius of first transition pulley 152, an offsetting clockwise torque may be generated by a downward force from cable 116 that is less than the downward force from cable 114. Accordingly, transition pulley assembly 150 reduces the effect of the downward force from cable 114 (generated by the spring 132) upon cable 116 and generally amplifies the effect of the downward force from cable 116 (generated by the weight of the moving bracket 110) upon cable 114. The ratio of the radii of first and second transition pulleys may be modified to increase or decrease the amplification/reducing effect of transition pulley assembly 150. In some cases the amplification/reducing effect across lift mechanism 100 may be increased by incorporating a plurality of transition pulleys. Thus, transition pulley assembly 150 can be considered to have a force multiplier effect that enables it to transition between the forces.

A lift mechanism that provides a transition pulley assembly configured to amplify/reduce forces may allow the lift mechanism to have a low or compact profile. For example lift mechanism 100 may include spring 132 with a contracting force greater than the gravitational force caused by the weight of moving bracket 110 and a load attached thereto. Spring 132 may have a higher contracting force because its force may be reduced across lift mechanism 100 by transition pulley assembly 150. Generally, springs with a higher contracting force may be configured to be shorter and smaller (e.g., the diameter of spring) than springs with lesser contracting forces, thus spring 132 may be configured to have a smaller profile thereby contributing to a more compact profile for lift mechanism 100.

Furthermore, a balancing force across lift mechanism 100 may be achieved with less deflection of a spring with a higher contracting force as compared to a spring with lesser contracting force. It should be appreciated that a shorter deflection of spring 132 may allow moving bracket 110, and as a result lift mechanism 100, to have a smaller profile. For example, the height of the lift mechanism 100 can be decreased while still accommodating a shorter spring deflection. Furthermore, less deflection in spring 132 may require a smaller cam 172. As noted above, springs generally provide a variable force that varies as a function of the deflection of the spring, thus a range of deflection determines the variance in force. Consequently, a spring with a shorter deflection may have less variance in force. Because lift mechanism 100 uses cam 172 to convert the variable force of spring 132 to a constant linear force, a shorter deflection of spring 132 having less variance in force may require a smaller cam to convert the force. Accordingly, a cam with a smaller profile may contribute to a more compact profile to lift mechanism 100.

A lift mechanism with a low profile can provide a number of advantages. For example, a low profile lift mechanism may provide for ease of incorporation into a lift mechanism or positioning apparatus. For example, a positioning apparatus configured to position an electronic display may incorporate a low profile lift mechanism such that the lift mechanism is concealed from a viewing angle of the electronic device. Furthermore, lift mechanisms that are configured to translate with an electronic device, like lift mechanism 100 of FIG. 1, may be concealed by the electronic device throughout a range of travel of the lift mechanism. FIGS. 13-16, and 22-26 are examples of lift mechanisms and positioning apparatuses incorporating low profile lift mechanisms that may be concealed by an electronic device through a range of travel.

Transition pulley assembly 150 and cam assembly 170 may also be configured to increase the range of travel 111 of moving bracket 110 in comparison to the deflection of spring 132. For example, an upward pull force on cable 114 may cause spring 132 to deflect a first distance. Accordingly, first transition pulley 152 winds in a length of cable 114 equal to the first distance. Simultaneously, second transition pulley 154 unwinds a length of cable 116 equal to a second distance. In this example, the ratio of the first distance to the second distance is correlated with the ratio between the radii of first transition pulley 152 and second transition pulley 154. Consequently, transition pulley assembly may allow for displacement of moving bracket 110 greater than the distance of deflection of spring 132.

Transition pulley assembly 150 is thus configured to deflect spring 132 a length along the range of deflection 133 that is less than the length of a corresponding movement of moving bracket 110 through range of travel 111. Transition pulley assembly 150 is configured to provide a first travel multiplier for transitioning between deflections of the spring assembly and corresponding movements of the moving bracket. The ratio of the radii of first and second transition pulleys may be modified to increase or decrease the travel multiplier of the transition pulley assembly 150. In some cases, for example, the travel multiplier may be at least about two corresponding to pulley 154 having a radius twice as long as pulley 152.

In some cases a lift mechanism may have a single stage transition assembly or a multi-stage transition assembly. Referring to FIG. 1, in this embodiment both transition pulley assembly 150 and cam assembly 170 operate as transition assemblies in that each is configured to provide a travel multiplier for transitioning between deflections of spring assembly 130 and corresponding movements of the moving bracket 110. The transition pulley assembly 150 is configured to provide a first travel multiplier, while the cam assembly is configured to provide a second travel multiplier. The combined effect of the multipliers provides an even greater travel to deflection ratio than with just one transition assembly. In some cases the range of travel 111 may be at least about three times longer than the range of deflection 133. In some cases the range of travel 111 may be between about two and about five times longer than the range of deflection 133.

FIG. 2A shows a top plan view of a lower portion of lift mechanism 100 of FIG. 1 attached to a support structure 102. Support bracket 120 can be attached to support structure 102 and is disposed in sliding engagement with moving bracket 110. Sliding elements 112a and 112b of moving bracket 110 can be configured to engage with sliding elements 122a and 122b of support bracket 120, respectively. Cam assembly 170 can be coupled to moving bracket 110 by axle 179 allowing cam assembly 170 to travel along with moving bracket 110 as it is translated relative to support bracket 120. Cam assembly may also be configured to rotate about axle 179. Additionally, cam 172 can be rotationally fixed to wheel 174. FIG. 2B shows a top plan view of a top portion lift mechanism 100 showing transition pulley assembly 150 coupled to moving bracket 110 by axle 156 allowing transition pulley assembly 150 to travel along with moving bracket 110 as it is translated relative to support bracket 120. Transition pulley assembly 150 may also be configured to rotate about axle 156. Additionally, first transition pulley 152 is rotationally fixed with second transition pulley 154. FIG. 2C shows a top plan view of lift mechanism 100 and illustrates the positioning of transition pulley assembly 150, cam assembly 170 and spring assembly 130 relative to one another. In this example, transition pulley assembly 150 is positioned above cam assembly 170 and therefore partially blocks the view of cam assembly 170. Also shown in FIG. 2C is cable 118 which couples wheel 174 to fixed member 120.

Though not necessarily required, in some embodiments providing lift mechanism 100 in which spring assembly 130, transition pulley assembly 150, and cam assembly 170 can all be coupled to moving bracket 110 can provide a number of advantages over lift mechanisms where one or more of these elements are coupled to a stationary support bracket of the lift mechanism. It should be appreciated that in this example, the only fixed element of lift mechanism 100 is support bracket 120. Thus, when lift mechanism 100 is incorporated into a positioning apparatus configured to position a display, moving bracket 110, and all the elements coupled therein, may be translated with the display. In certain examples, particularly where lift mechanism 100 has a low profile, a substantial portion of lift mechanism 100 may be concealed by a viewing angle of the display throughout the range of travel of the positioning apparatus. For example, the moving bracket of the lift mechanism may have a housing with a height no more than the height of a display, a width no longer than a display, and in some cases a thickness no more than a thickness of the display (e.g., depending upon the type of display). As noted above, FIGS. 13-16, and 22-26 are examples of lift mechanisms and positioning apparatuses incorporating low profile lift mechanisms that may be concealed by an electronic device through a range of travel.

FIGS. 2A-2C also shows a skin 104 attached to moving bracket 110. Skin 104 may be configured to cover an open back of moving bracket 110 to limit access to components mounted in the housing, including a number of cables and springs under high tension. Thus, enclosing the moving bracket 110 with skin 104 could reduce the risk of injury to the operator or installer. Skin 104 may be configured to accommodate the translation of moving bracket 110 relative to support bracket 120. FIG. 17 is an example of a positioning apparatus including a skin covering an open back of a moving bracket. Referring briefly back to FIG. 1, a skin like skin 104 could be considered a surface covering part of the moving bracket that is rendered transparent for the sake of clarity in FIG. 1.

FIG. 3A is an elevation view of a lift mechanism 300 in accordance with an embodiment with one or more portions rendered transparent for clarity. As with FIG. 1, lift mechanism 300 can include optional first and second surfaces of the moving bracket 310, which are rendered transparent for clarity. Lift mechanism 300 is similar to lift mechanism 100 of FIG. 1 except that the orientation of cam 372 has been reversed. For example, lift mechanism 300 includes moving bracket 310 and support bracket 320, which may be disposed in sliding engagement with one another such that moving bracket 310 may translate with respect to support bracket 320 along a range of travel 311 relative to the support bracket. Lift mechanism 300 also includes spring assembly 330, transition assembly 349, and cam assembly 370.

In this embodiment, cable 318 of lift mechanism 300 attaches to a different portion of fixed member 320. In some examples, a tab (not shown) may extend from fixed member 320 to allow for easy attachment of cable 318 to fixed member 320. The tab may also be configured to allow cable 318 to attach to fixed member 320 in a position where cable 318 is aligned with wheel 374 to reduce the chance of cable 318 slipping off of wheel 374 during the course of operating lift mechanism 300.

As with the example shown in FIG. 1, translation of moving bracket 310 relative to support bracket 320 may cause a deflection of spring 332. FIGS. 3B-3E are elevation views of the lift mechanism 300 of FIG. 3A in various positions with one or more portions rendered transparent for clarity. For example, FIG. 3B shows lift mechanism 300 positioned at a peak of a vertical range of motion 311 of the lift mechanism. When moving bracket 310 is translated down relative to support bracket 320 (e.g., by increasing the weight on moving bracket 310 or pulling down on moving bracket 310), the force of the downward translation breaks the equilibrium of forces across moving bracket 310 and support bracket 320 and creates an upward pull force on cable 318 greater than the downward pull force exerted by spring 332 on cable 314. Accordingly, the upward pull force on cable 318 causes cam assembly 370 to rotate clockwise which unwinds cable 318 from wheel 374 and causes cam 372 to wind in cable 316 along cam surface 378. This in turn causes transition pulley assembly 350 to rotate clockwise which unwinds cable 316 from second transition pulley 354 and causes first transition pulley 352 to wind in cable 314 to stretch out spring 332. Rotation of cam assembly 370 and deflection of spring 332 can be seen in FIGS. 3C-3E as moving bracket 310 moves progressively down through the range of travel 311.

Continuing with FIGS. 3B-3E, transition pulley assembly 350 and cam assembly 370 may also be configured to increase the range of travel 311 of moving bracket 310 in comparison to the deflection of spring 332. For example, an upward pull force on cable 314 may cause spring 332 to deflect a first distance. Accordingly, first transition pulley 352 winds in a length of cable 314 equal to the first distance. Simultaneously, second transition pulley 354 unwinds a length of cable 316 equal to a second distance. In this example, the ratio of the first distance to the second distance is correlated with the ratio between the radii of first transition pulley 352 and second transition pulley 354. Consequently, transition pulley assembly may allow for displacement of moving bracket 310 greater than the distance of deflection of spring 332.

Transition pulley assembly 350 is thus configured to deflect spring 332 a length along the range of deflection 333 that is less than the length of a corresponding movement of moving bracket 310 through range of travel 311. Transition pulley assembly 350 is configured to provide a first travel multiplier for transitioning between deflections of the spring assembly and corresponding movements of the moving bracket. The ratio of the radii of first and second transition pulleys may be modified to increase or decrease the travel multiplier of the transition pulley assembly 350. In some cases, for example, the travel multiplier may be at least about two corresponding to pulley 354 having a radius twice as long as pulley 352.

Figure 4:
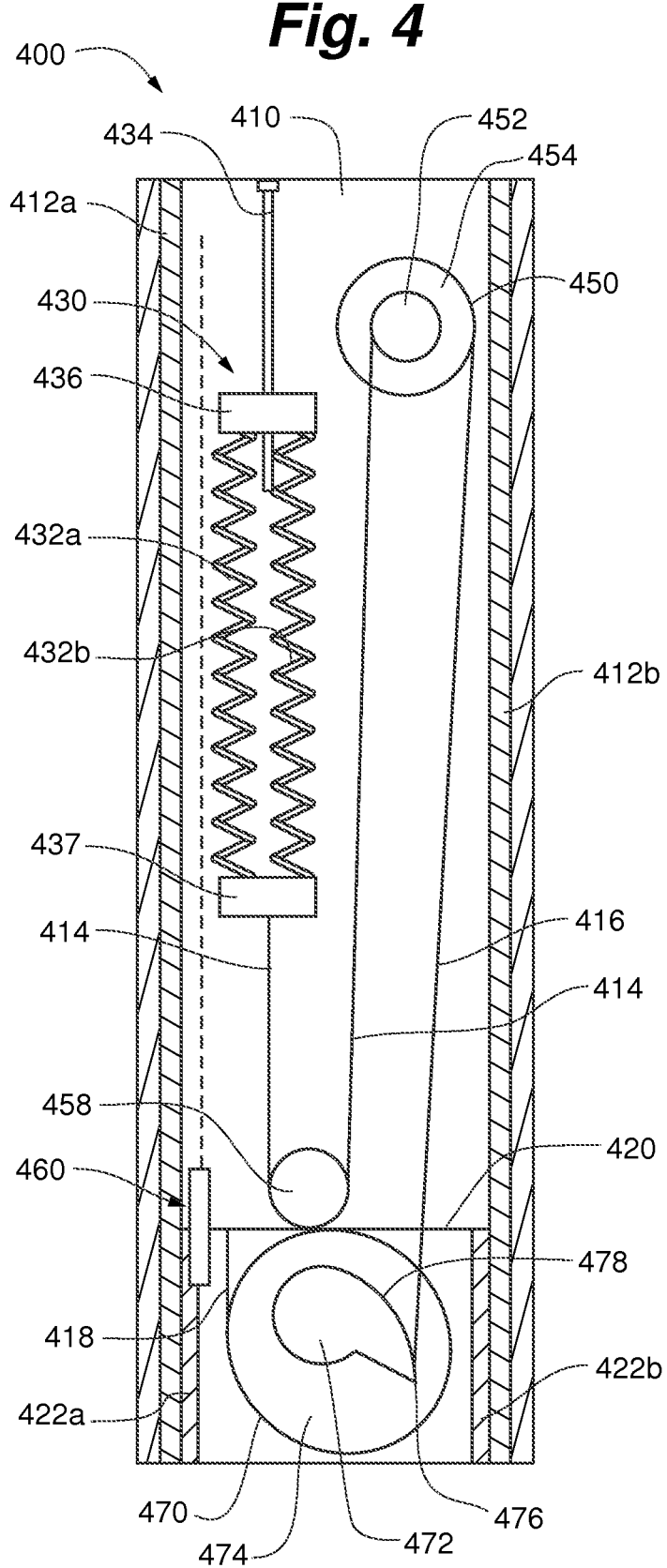
FIG. 4 is an elevation view of a lift mechanism in accordance with an embodiment with one or more portions rendered transparent for clarity.

FIG. 4 is an elevation view of a lift mechanism 400 in accordance with an embodiment of the invention. Lift mechanism 400 is similar to lift mechanism 100 of FIG. 1 as it includes a moving bracket 410, support bracket 420, transition pulley assembly 450, and cam assembly 470. In addition, like FIG. 1, optional first and second surfaces of the moving bracket 410 are rendered transparent for clarity. Moving bracket 410 and support bracket 420 may be disposed in sliding engagement with one another such that moving bracket 410 may translate with respect to support bracket 420 using sliding mechanisms 412a, 412b, 422a, and 422b. Transition pulley assembly 450 may be coupled to moving bracket 410 and includes first and second transition pulleys 452 and 454, respectively. The transition pulley assembly may be configured to transmit, amplify/reduce, and redirect forces through lift mechanism 400 as well as increase the range of travel of moving bracket 410 compared to the deflection of spring assembly 430. Cam assembly 470 may also be coupled to moving bracket 410 and includes cam 472 and wheel 474. The cam assembly may be configured to transmit, amplify/reduce, and redirect forces through lift mechanism 400. Additionally, cam assembly 470 may use cam 472 to convert a varying contracting force of spring assembly 430 into a constant linear force using cam 472.

Lift mechanism 400 also includes spring assembly 430 and idler pulley 458, also coupled to moving bracket 410 as shown in FIG. 4. Spring assembly 430 may be configured to provide a balancing force between moving bracket 410 and support bracket 420 and includes a top guide bracket 436, bottom guide bracket 437, springs 432a and 432b, and adjustment mechanism 434. In this example, spring assembly 430 is coupled to a top portion of moving bracket 410 by adjustment mechanism 434. Adjustment mechanism 434 may be configured to adjust the balancing force provided by spring assembly 430 by translating top guide bracket 436 relative to the top portion of moving bracket 410. Cable 414 connects spring assembly 430 to transition pulley assembly 450 by way of idler pulley 458. In this example, idler pulley 458 may be coupled to moving bracket 410 and is configured to transmit and redirect forces through lift mechanism 400.

Figure 7A:
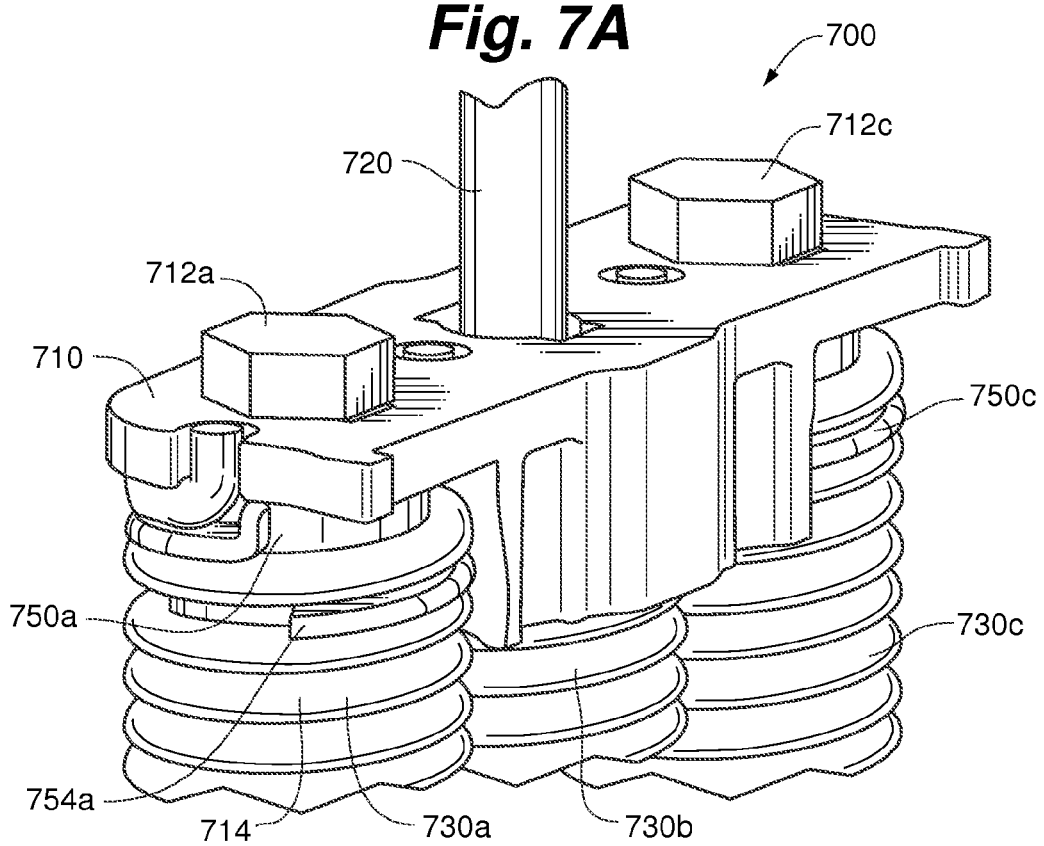
FIG. 7A is a partial perspective view of a top portion of a spring assembly in accordance with an embodiment.

Brackets 436 and 437 can be configured to secure springs 432a and 432b and protect them from inadvertent contact during the operation of lift mechanism 400. Brackets 436 and 437 can also be configured to aggregate the contracting forces of springs 432a and 432b. Additional examples of guide brackets are shown in FIGS. 6A, 7A and 8. A balancing force between moving bracket 410 and support bracket 420 may be provided by springs 432a and 432b. Providing lift mechanism 400 with a spring assembly incorporating a plurality of springs provides a number of advantages over lift mechanisms employing a single spring. For example, utilizing a plurality of springs may increase the contracting force of spring assembly 430 and may allow a lift mechanism to balance heavier loads. In certain examples, a plurality of springs may decrease the deflection distance of spring assembly 430 thereby contributing to a lower profile of lift mechanism 400. Furthermore, apportioning the weight of moving bracket 410, and any load attached thereto, across a plurality of springs may decrease stress and fatigue of each spring, thus increasing the life of the lift mechanism. While spring assembly 430 is shown in FIG. 4 to have two springs, it can be appreciated that a lift mechanism may be configured to incorporate any number of springs.

Lift mechanism 400 is operatively coupled between moving bracket 410 and support bracket 420 by cables 414, 416, and 418 through spring assembly 430, idler pulley 458, transition pulley assembly 450, and cam assembly 470. Referencing FIG. 4, spring assembly 430 applies an upward linear force to a first portion of cable 414 which applies a clockwise torque across idler pulley 458. Idler pulley 458 redirects this force into a downward linear force to a second portion of cable 414 which applies counter-clockwise torque across transition pulley assembly 450. This in turn urges first transition pulley to unwind cable 414 and second transition pulley to wind in cable 416. The counter-clockwise torque across transition pulley assembly 450 also applies an upward linear force to cable 416 which creates a counter-clockwise torque across cam assembly 470. This torque urges cam 472 to unwind cable 416 and wheel 474 to wind in cable 418. Lift mechanism 400 is balanced when a gravitational force of the weight of moving bracket 410, as well as any load coupled thereto, applies an upward linear force to cable 418 as to create torque forces equal in magnitude and opposite in direction from the force described above for idler pulley 458, transition pulley assembly 450, and cam assembly 470. Thus, lift mechanism 400 may provide a balancing force such that an operator may position equipment attached to moving bracket 410 at any desired height along a range of travel, having only to overcome the friction of the system. Further, because of the balancing force provided, the moving bracket 410 can more easily hold its set position without the operator having to engage any locks (although one or more optional locks may be provided in some cases).

Lift mechanism 400 can also include a brake assembly 460. As will be discussed further herein, brake assembly 460 can be configured to lock moving bracket 410 relative to support bracket 420 in the situation where moving bracket 410 is no longer operatively coupled to support bracket 420 (e.g., any of cables 414, 416, or 418 break). An example of a brake assembly will be discussed with respect to FIGS. 11A-11C.

FIGS. 5A, 5B and 5C are elevation views of lift mechanisms where transition pulley assembly 550 is coupled to a top, a middle and a bottom portion of moving bracket 510, respectively. Portions of FIGS. 5A-5C are rendered transparent as in FIG. 4 for clarity. These series of figures illustrate potential advantages and disadvantages that may come with the positioning of transition pulley assembly 550 within moving bracket 510. For example, the positioning of transition pulley assembly in FIG. 5C may provide for a more compact profile to a lift mechanism than the positioning of the transition pulley assemblies shown in FIGS. 5A and 5B. The position of transition pulley assembly 550 relative to cam assembly 570 may also vary the force necessary to rotate the cam assembly. For example, the angle 573 in FIG. 5C created by cable 516 and camming surface 578 is larger than the angles 573 of FIGS. 5A and 5B. It should be appreciated that the upward force required to rotate cam 572 counter-clockwise is directly correlated with the size of angle 573. More specifically, less upward force needs to be applied to cable 516 to rotate cam 572 in FIG. 5C than 5A and 5B because angle 573 is greatest in FIG. 5C. Also, the position of transition pulley assembly 550 relative to cam assembly 570 and idler pulley 558 may affect the length of cables 514 and 516. For example, the lengths of cables 514 and 516 are the shortest in FIG. 5C. As can be appreciated a shorter cable may be less prone to breakage and provide cost benefits to the manufacturing of a lift mechanism.

FIG. 6A is a side plan view of a spring assembly 600 in accordance with an embodiment of the invention. In this example, spring assembly 600 includes a top guide bracket 610, bottom guide bracket 620, springs 612a and 612b, and adjustment mechanism 630. As noted above, adjustment mechanism 630 may be configured to couple spring assembly 600 to a moving bracket of a lift mechanism. In this example, bolt 632 and washer 631 may be used to couple spring assembly 600 to a moving bracket while bolt 632 and another washer (not shown) secures adjustment mechanism 630 to top guide bracket 610. Adjustment mechanism 630 may also be configured to adjust the tension of springs 612a and 612b by rotating bolt 632. Generally, the head of bolt 632 is situated outside of a moving bracket and may be accessible to an operator. Washer 636 may be glued to bolt 632 to prevent over adjustment of adjustment mechanism 632. Top guide bracket 610 is configured to secure a top end of springs 612a and 612b using securing mechanisms 614a and 614b, respectively. Similarly, bottom guide bracket 620 is configured to secure a bottom end of springs 612a and 612b.

FIG. 6B is a side plan view of a spring in accordance with an embodiment of the invention. Spring 650 includes a tapered top end 654 and an opening 652 to provide a means to secure the top end of the spring to a guide bracket. For example, a "bullet" type mechanism may be used to couple a cable to spring 650 and is described in U.S. Patent Application Publication 2012/0069508 A1, filed Nov. 23, 2011, the entire disclosure of which is hereby incorporated by reference. Spring 650 may also include a bottom end 656. In this example, bottom end 656 is hook-shaped and may be used to couple the spring to a bottom guide bracket.

FIG. 7A is a partial perspective view of a top portion of a spring assembly 700 and FIG. 8 is a partial cross-sectional view of FIG. 7A, in accordance with an embodiment of the invention. Spring assembly 700 includes a top guide bracket 710, adjustment mechanism 720, springs 730a-730c and corresponding threading elements 750a-750c configured to couple an end of the springs to the top guide bracket 710. In this example, springs 730a-730c are coupled to top guide bracket 710 by three corresponding threading elements, including threading element 750a, middle threading element 750b (not shown in FIG. 7A) and threading element 750c.

Figure 7B:
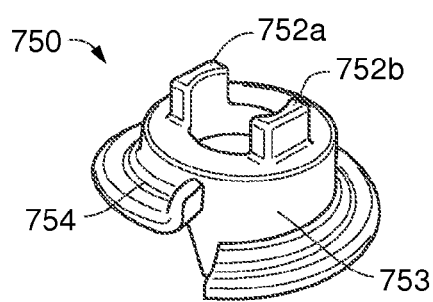
FIG. 7B is a perspective view of a threading element in accordance with an embodiment.
Figure 7C:
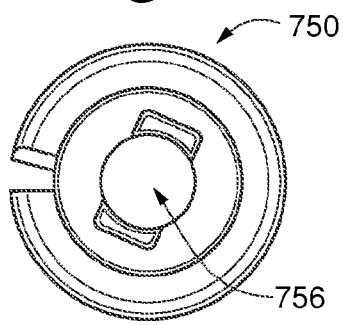
FIG. 7C is a top view of the threading element of FIG. 7B.
Figure 7D:
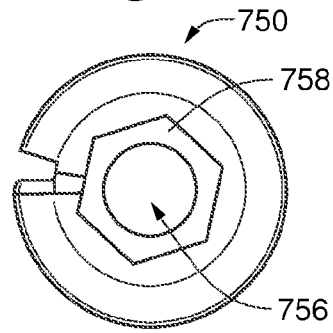
FIG. 7D is a bottom view of the threading element of FIG. 7B.

FIG. 7B is a perspective view of a threading element 750 which shows protrusions 752a and 752b, a core section 753 configured to position the threading element within the diameter of the spring, and threading section/interface 754 that provides a spring interface. Threading element 750 is similar to threading elements 750a, 750c of FIG. 7A. Threading section 754 may be helical in shape and is configured to thread with a coil of a spring. For example, FIG. 7A shows spring interface 754a of threading element 750a threaded with coil 714 of spring 730a. In this example, the friction between spring interface 754a and spring coil 714 generated by the contracting force of spring 730a secures spring 730a to threading element 750a by preventing threading element 750a from becoming "unscrewed" from the spring. Protrusions 752a and 752b can be configured to interface with a top guide bracket and prevent a threading element, and a spring secured thereto, from rotating relative to the top guide bracket. For example, top guide bracket 710 of FIG. 7A may include cavities (not shown) that correspond with the protrusions 752a and 752b (not shown). FIG. 7C is a top view of the threading element of FIG. 7b which shows a through-hole 756. Through-hole 756 provides a fastener section of the threading element and is configured to accept a bolt or securing mechanism that may be used to secure threading element 750 to a top guide bracket. FIG. 7D is a bottom view of the threading element of FIG. 7B and shows impression 758 centered around through-hole 756. Impression 758 may be configured to accept a hex-nut that may be used together with a bolt or securing mechanism to secure the threading element.

FIG. 8 is a cross-sectional view of spring assembly 700 of FIG. 7A. FIG. 8 shows threading elements 750a-750c secured to springs 730a-730c, respectively. In the embodiment shown, threading element 750a is secured to top guide bracket by bolt 712a and hex-nut 760a which fits into impression 758a of the threading element. Impression 758a can rotationally secure hex-nut 760a to allow an operator or installer to adjust bolt 712a relative to hex-nut 760a without using a tool to secure the hex-nut. Threading element 750c can similarly be secured to top guide bracket by bolt 712c and hex-nut 760c, and threading element 750b can be secured to top guide bracket by adjustment mechanism 720 and hex-nut 760b. Hex-nut or washer 762 may be fixed or glued to adjustment mechanism 720 to prevent an operator from unscrewing adjustment mechanism 720 from hex-nut 760b.

FIG. 9 is an elevation view of a lift mechanism 900 in accordance with an embodiment of the invention with portions rendered transparent in a similar fashion to previous figures. Lift mechanism 900 includes a moving bracket 910, support bracket 920, spring assembly 930, idler pulley 958, transition pulley assembly 950, cam assembly 970 and brake assembly 960. Lift mechanism 900 operates similarly to lift mechanism 100 of FIG. 1 and lift mechanism 400 of FIG. 4. Moving bracket 910 and support bracket 920 may be disposed in sliding engagement with one another such that moving bracket 910 may translate with respect to support bracket 920 by sliding mechanisms or any other suitable engagement mechanism. Transition pulley assembly 950 may be coupled to moving bracket 910 and includes first and second transition pulleys 952 and 954, respectively. The transition pulley assembly may be configured to transmit, amplify/reduce, and redirect forces through lift mechanism 900 as well as increase the range of travel of moving bracket 910 in comparison to the deflection of spring assembly 930. Cam assembly 970 may be coupled to moving bracket 910 and includes cam 972 and wheel 974. The cam assembly may also be configured to transmit, amplify/reduce, and redirect forces through lift mechanism 900. Additionally, cam assembly 970 may be configured to convert a varying contracting force of spring assembly 930 into a constant linear force using cam 972.

Lift mechanism 900 is operatively coupled between moving bracket 910 and support bracket 920 by cables 914, 916, and 918 through spring assembly 930, idler pulley 958, cam assembly 970, transition pulley assembly 950, and brake assembly 960. Referencing FIG. 9, moving bracket 910 is shown in a high position along a range of travel 911 defined with respect to the top of the moving bracket 910. An explanation of forces within lift mechanism 900 during an equilibrium state will now be provided according to some embodiments. When the illustrated embodiment of FIG. 9 is in an equilibrium state, spring assembly 930 tends to deflect upward (contracting) through a range of deflection 921 and thus applies an upward linear force to cable 914 which is routed by idler pulley 958 to cam assembly 970. This upward force applies a counter-clockwise torque across cam assembly 970. This counter-clockwise torque urges cam 972 and wheel 974 to rotate counter-clockwise, and thus wheel 974 applies an upward force to cable 916. The upward force applied to cable 916 applies a counter-clockwise torque across transition pulley assembly 950. This torque urges first and second transition pulleys 952, 954 to rotate counter-clockwise, thus applying a downward force to cable 918

Lift mechanism 900 is balanced when a gravitational force of the weight of moving bracket 910, as well as any load coupled thereto, urges the moving bracket 910 downward along the range of travel 911, thus applying an upward linear force to cable 918 at its attachment point to support bracket 1020. This upward force generated by the weight of the moving bracket 910 and associated load creates torque forces equal in magnitude but opposite in direction to the forces described above for transition pulley assembly 950 and cam assembly 970. Thus, lift mechanism 900 may provide a balancing force such that an operator may position equipment attached to mounting portion 910 at any desired height along a range of travel, having only to overcome the friction of the system. Further, because of the balancing force provided, the mounting portion 910 will hold its set position without requiring an operator to engage any optional locks if present.

Figure 10A:
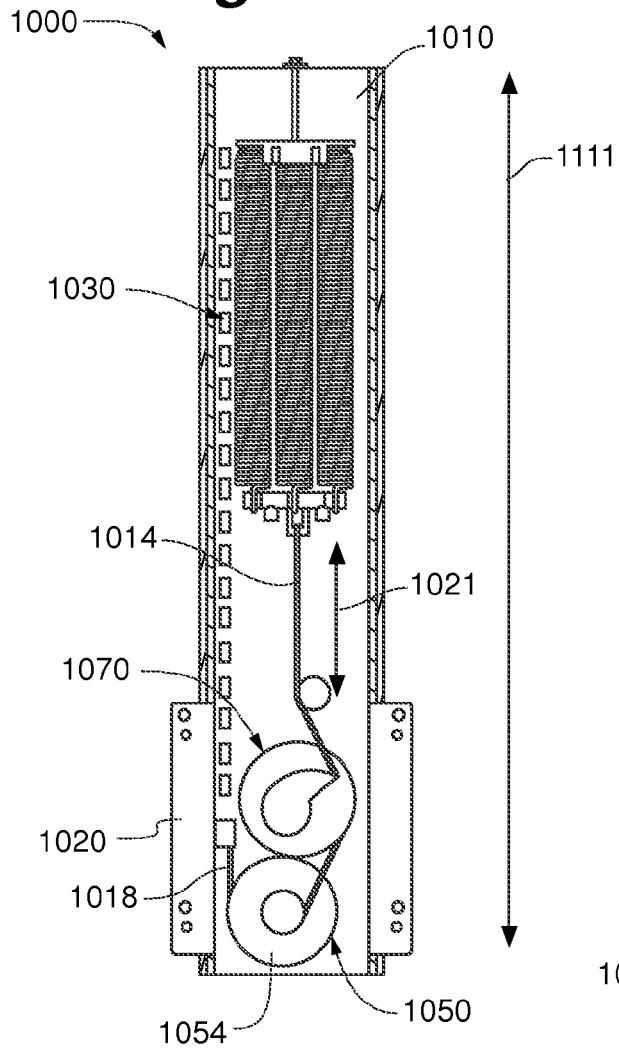
FIGS. 10A and 10B are elevation views of a lift mechanism in accordance with an embodiment with one or more portions rendered transparent for clarity.
Figure 10B:
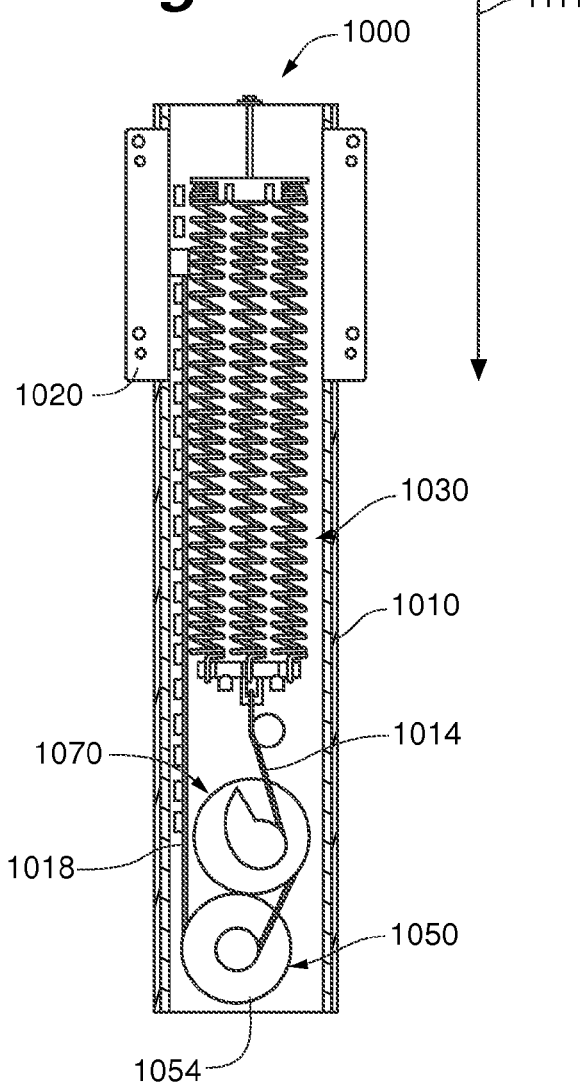

FIGS. 10A and 10B are elevation views of a lift mechanism 1000 in accordance with an embodiment of the invention. FIG. 10A shows moving bracket 1010 in a raised position, balanced at a peak of a range of travel 1011 of lift mechanism 1000 relative to support bracket 1020, while FIG. 10B shows moving bracket 1010 balanced in a lowered position at the bottom of the range of travel. Translating moving bracket 1010 from the position in FIG. 10A to the position in FIG. 10B applies an upward pull force on cable 1018 causing it to unwind from second transition pulley 1054. The pull force of cable 1018 is amplified by transition pulley assembly 1050 and cam assembly 1070 and generates a downward pull force on cable 1014 causing spring assembly 1030 to deflect along a range of deflection 1021 that is shorter than the range of travel 1011. Conversely, translating moving bracket 1010 from the position in FIG. 10B to the position in FIG. 10A causes spring assembly 1030 to contract and generate an upward pull force on cable 1014. The pull force of cable 1014 is reduced by cam assembly 1070 and transition pulley assembly 1050 and causes second transition pulley 1054 to wind in cable 1018 which in turn translates moving bracket 1010 up relative to support bracket 1020.

Figure 11A:
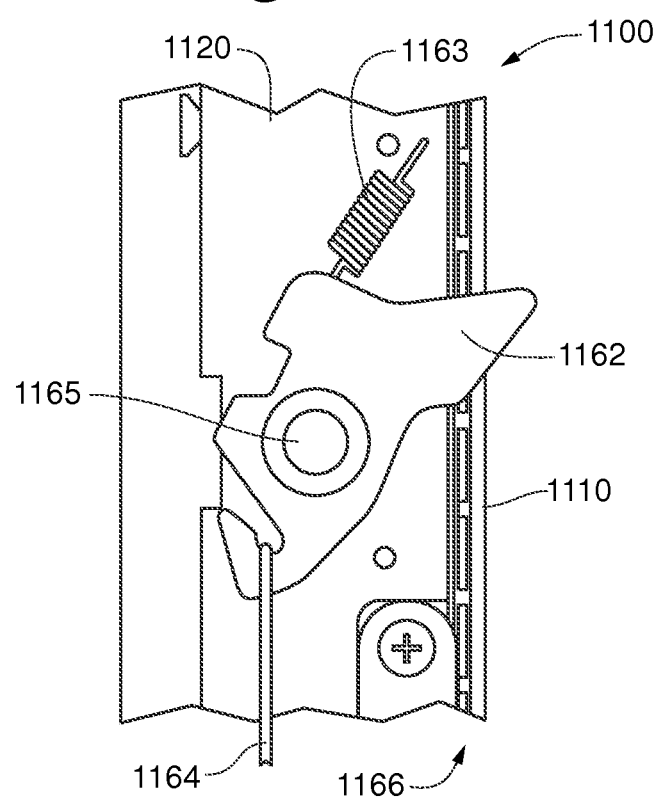
FIG. 11A is a partial view of a brake assembly in accordance with an embodiment.
Figure 11B:
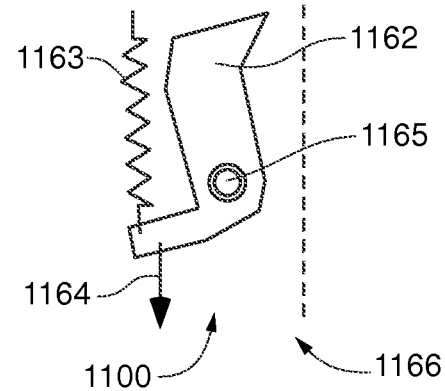
FIGS. 11B-11C are schematic representations of a brake assembly in accordance with an embodiment.
Figure 11C:
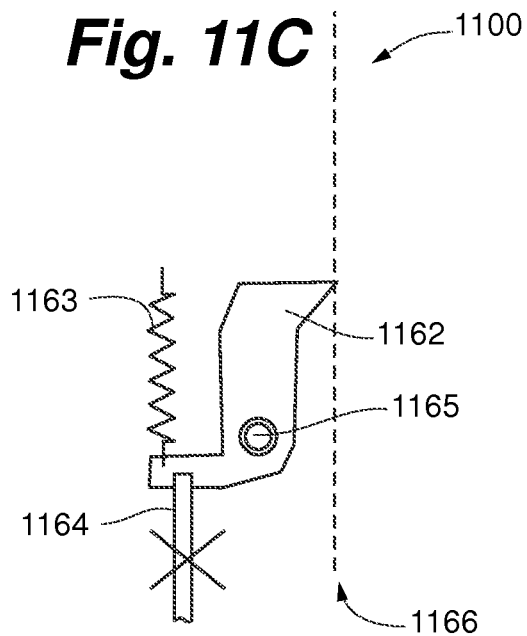

FIG. 11A-11C are side and schematic views of a brake mechanism 1100 in accordance with an embodiment of the invention. As noted above, brake mechanism 1100 may be incorporated into a lift mechanism to lock a moving bracket relative to a support bracket in a situation where a cable of the lift mechanism should break. Brake mechanism 1100 can include brake latch 1162, truck rope 1164, spring 1163 and plurality of slots 1166. FIG. 11A shows brake latch 1162 incorporated into brake mechanism 1100 that may be coupled to a support bracket 1120 by axle 1165 such that brake latch 1162 rotates about the axle. Brake latch 1162 may be configured to engage with plurality of slots 1166. Plurality of slots 1166 may be located on moving bracket 1110 and may be aligned with brake latch 1162 throughout the range of travel of lift mechanism 11620. Spring 1163 can be configured to urge brake latch 1162 to engage with plurality of slots 1166 while truck rope 1164 is configured to urge brake latch 1162 to disengage from the plurality of slots. FIG. 11B shows brake latch 1162 disengaged from plurality of slots 1166. In this example, truck rope 1164 may be a cable that is connectively coupled to a spring assembly of a lift mechanism (e.g. cable 118 of FIG. 1, cable 418 of FIG. 4, or cable 918 of FIG. 9, or cable 1018 of FIG. 10). A downward linear force, which may be provided by a spring assembly, on the truck rope overcomes the upward contracting force of spring 1163 thereby holding brake latch 1162 in a disengaged position relative to plurality of slots 1166. FIG. 11B shows a situation where there is little to no downward linear force on truck rope 1164 (e.g., a cable of the lift mechanism broke) thus allowing the contracting force of spring 1163 to engage brake latch 1162 with plurality of slots 1166 thereby locking the moving bracket relative to the support bracket of the balancing mechanism.

Figure 12:
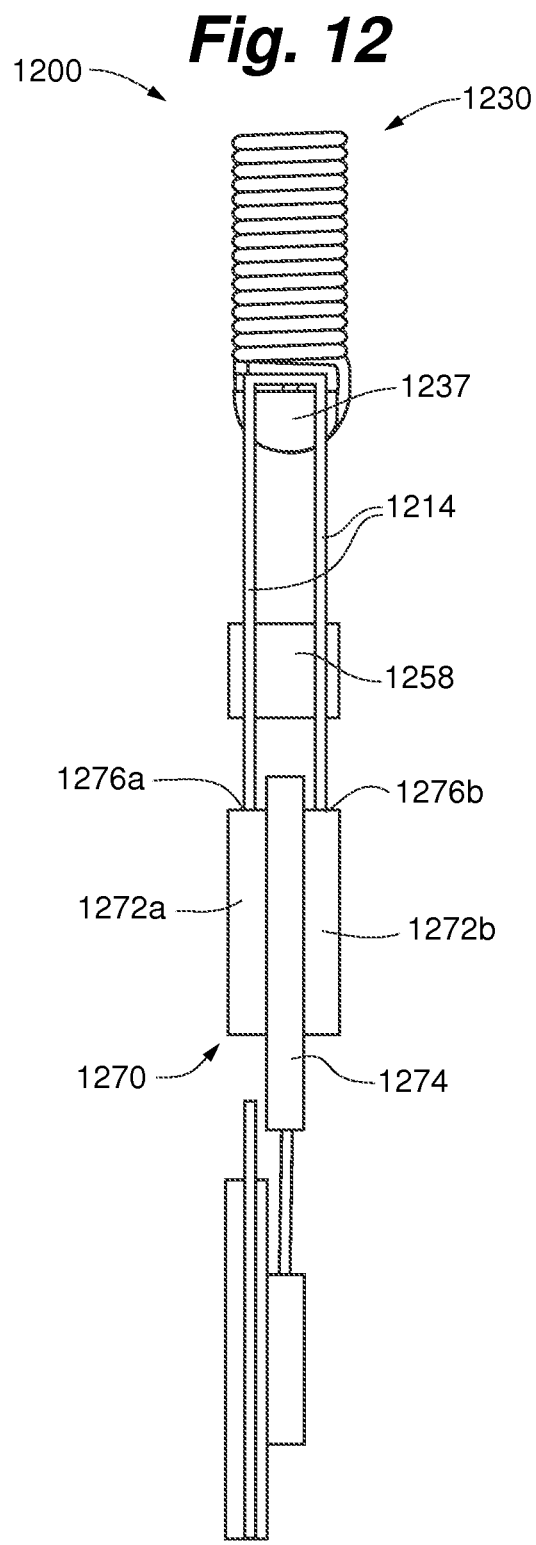
FIG. 12 is a partial elevation view of a lift mechanism in accordance with an embodiment.

FIG. 12 is a partial elevation view of a lift mechanism 1200 in accordance with an embodiment of the invention. Lift mechanism 1200 is similar to lift mechanism 900 of FIG. 9 except that it is configured to incorporate two cams into cam assembly 1270. In this example, cams 1272a and 1272b are each rotationally fixed with respect to wheel 1274. The cams are mounted in a mirrored orientation on opposite faces of the wheel 1274 and are coupled to spring assembly 1230 by cable 1214. A first end of cable 1214 is attached to attachment post 1276b of cam 1272b. A second end of cable 1214 is redirected by idler pulley 1258, threaded through bottom bracket 1237 of spring assembly 1230, redirected again by idler pulley 1258, and attached to attachment post 1276a of cam 1272a. Apportioning the force from spring assembly 1230 between multiple cams may decrease stress and fatigue on cable 1214, thus increasing the life of lift mechanism 1200. Reducing the tension on cable 1214 coupled to each cam also allows for a smaller effective radius of the cams, since the contracting force of spring assembly 1230 is distributed across two portions of cable 1214. In addition, the ability use smaller cams may contribute to a more compact profile for lift mechanism 1200. While lift mechanism 1200 is described to incorporate a pair of cams, it can be appreciated that a lift mechanism may incorporate any number of cams in parallel or in series.

Figure 13:
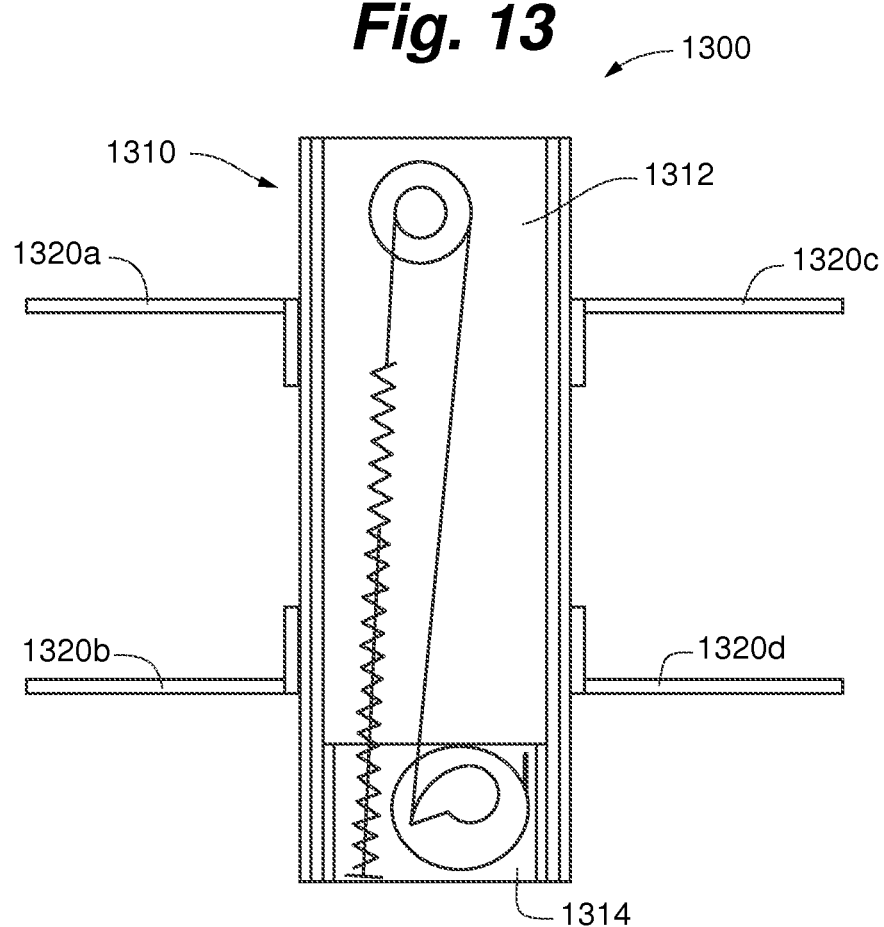
FIG. 13 is an elevation view of a lift mechanism in accordance with an embodiment with one or more portions rendered transparent for clarity.

FIG. 13 is an elevation view of a lift mechanism 1300 in accordance with an embodiment of the invention with portions rendered transparent in a similar fashion to previous figures. Lift mechanism 1300 incorporates lift mechanism 1310 and includes support brackets 1320a-1320d. The support brackets are attached to moving bracket 1312 of lift mechanism 1310 and are collectively adapted to allow for the mounting of an electronic display (not shown). Support bracket 1314 may be attached to a support structure (e.g., a base or a wall). Accordingly, an operator of lift mechanism 1300 may adjust the position of an electronic display along a range of travel of lift mechanism 1300 by translating moving bracket 1312 relative to support bracket 1314.

Figure 14:
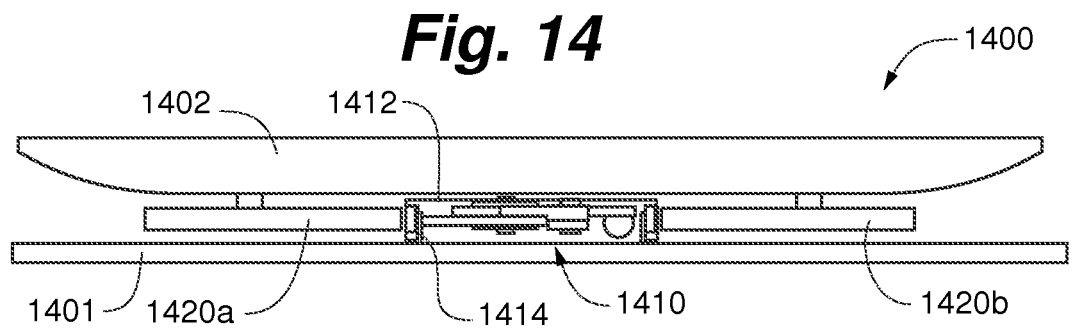
FIG. 14 is a top plan view of a display coupled to a display positioning apparatus in accordance with an embodiment with one or more portions rendered transparent for clarity.

FIG. 14 is a top plan view of a display positioning apparatus 1400 in accordance with an embodiment of the invention with some portions rendered transparent for clarity. In this example, display positioning apparatus 1400 includes lift mechanism 1410, which includes a support bracket 1414 that may be attached to support structure 1401. Lift mechanism 1410 also includes moving bracket 1412. Support brackets 1420a and 1420b may be attached to moving bracket 1412. Electronic display 1402 is mounted to the support brackets thereby allowing it to be moved along a range of travel of lift mechanism 1410.

FIG. 15 is a side elevation view of a display positioning apparatus 1500 that includes a lift mechanism 1510 having a support bracket 1514 attached to a support surface 1501, and a moving bracket 1512 in sliding engagement with the support bracket. The moving bracket 1512 is configured to couple to a display 1502 via support brackets 1520A, 1520B. FIG. 15 illustrates on example of how a low profile lift mechanism 1510 can allow for a moving bracket 1512 of the lift mechanism to be substantially concealed by electronic display 1502 from a viewing angle of the display. Furthermore, because moving bracket 1512 and electronic display 1502 are coupled together, moving bracket 1512 remains concealed by the display throughout the range of travel of lift mechanism 1510. As discussed above, it can be appreciated that in certain examples it may be easier, and more aesthetically pleasing, to incorporate a lift mechanism with a low profile into display positioning apparatus 1500.

FIG. 16 is an elevation view of a display and a positioning apparatus 1600 in accordance with an embodiment of the invention. Positioning apparatus 1600 includes tilt mechanism 1630 (not visible) coupled to a bottom portion of moving bracket 1612 of lift mechanism 1610. Tilt mechanism 1630 may be configured to allow an operator to tilt electronic display 1602 to change a viewing angle of the display. In certain cases the tilt mechanism may be counterbalanced, although this is not required. For example, the tilt mechanism 1630 may include a counterbalanced spring system (e.g., a torsion spring mechanism), a gravity tilt mechanism, a friction tilt mechanism, or a ball and socket mechanism, among other possibilities. U.S. Pat. No. 6,997,422, filed Aug. 20, 2003; U.S. Pat. No. 7,252,277, filed Jan. 17, 2004; and U.S. Patent Application Publication US 2006/0185563 A1, filed Sep. 28, 2005, provide examples of possible tilt and rotation mechanisms, the entire disclosure of each of which is hereby incorporated herein by reference.

FIG. 17 is a perspective view of a positioning apparatus 1700 in accordance with an embodiment of the invention. Position apparatus 1700 includes lift mechanism 1710, support brackets 1720a-1720d, mounting brackets 1760a and 1760b, and tilt mechanisms 1730a and 1730b. In this example, support bracket 1714 of lift mechanism 1710 may be attached to a support structure. As will be discussed further herein, support brackets 1720a-1720d may be configured to interface with tilt brackets 1740a and 1740b to support mounting brackets 1760a and 1760b. The mounting brackets may be configured to allow for the mounting of an electronic display thereby allowing an operator of positioning apparatus 1700 to position the display along a range of travel of lift mechanism 1710. Positioning apparatus 1700 also includes skin 1716 configured to cover an open-back of moving bracket 1712. As noted above, moving bracket 1712 may include cable and springs under high tension that may potentially harm an operator or installer of positioning apparatus 1700. Skin 1716 may be configured to enclose moving bracket 1712 thereby reducing the risk of injury to the operator or installer. Skin 1716 may be configured and attached to moving bracket 1712 in such a way as to provide openings 1717a and 1717b to accommodate the translation of moving bracket 1712 relative to support bracket 1714. Tilt mechanisms 1730a and 1730b may be may include a counterbalanced spring system, gravity tilt mechanism, friction tilt mechanism, or ball and socket mechanism, among other possibilities.

FIG. 18 is a side view of a tilt bracket 1840 in accordance with an embodiment of the invention. Tilt bracket 1800 may be incorporated into tilt mechanism 1730a and 1730b of positioning apparatus 1700. As will be discussed further herein, tilt bracket 1840 includes support interfaces 1842 and 1844 that may be configured to interface with support brackets. Tilt bracket 1840 also includes channels 1846 and 1848 configured to be coupled to a mounting bracket using first and second support pins (not shown), respectively. The channels are adapted to support the weight of an electronic display that may be mounted to a mounting bracket and allow for the tilting of the mounting bracket and the electronic display.

FIGS. 19A and 19B are perspective views of a mounting bracket 1960 in accordance with an embodiment of the invention. Mounting bracket 1960 may include mounting interface 1962 adapted to allow for the mounting of an electronic display to the bracket. Mounting bracket 1960 may also be adapted to couple with tilt bracket 1840 of FIG. 18. For example, tilt bracket 1840 may be configured to fit into recess 1964 such that a first support pin (not shown) passes through hole 1966a, channel 1846, and hole 1966b, and a second support pin (not shown) passes through hole 1968a, channel 1848, and hole 1968b.

FIG. 20A is a side view of a positioning apparatus 2000 in accordance with an embodiment of the invention with portions rendered transparent for clarity. Positioning apparatus 2000 incorporates lift mechanism 2010 and is configured to translate an electronic display along a range of travel of the lift mechanism. Positioning apparatus 2000 is fixed to support structure 2001 and also includes support brackets 2020a and 2020b which may be attached to moving bracket 2012. Positioning apparatus 2000 also incorporates tilt mechanism 2030 which includes tilt bracket 2040 and mounting bracket 2060, which is rendered transparent in FIGS. 20A-21B for clarity. Mounting bracket 2060 has been rendered translucent to show tilt bracket 2040. FIG. 20B is a partial side view of a bottom portion of positioning apparatus 2000 of FIG. 20A. In this example, mounting bracket 2060 is coupled to tilt bracket 2040 by first and second support pins 2076 and 2078. The tilt bracket fits into a recess of mounting bracket 2060 in such a way that aligns holes of the mounting bracket to align with support channels 2046 and 2048 of tilt bracket 2040. First and second pins pass through the respective holes and channels to secure the mounting bracket to the tilt bracket. Tilt bracket 2040 may be configured to interface with support brackets 2020a and 2020b. Support interface 2042 may be configured to hang on support bracket 2020a and support interface 2044 may be configured to rest underneath support bracket 2020b to stabilize the tilt bracket in a vertical direction. Further, each support bracket may include tabs (e.g., see tabs 2021a and 2021b visible in FIG. 20B next to support bracket 2020B. The tabs can stabilize the tilt bracket in a horizontal direction. In this example, tilt bracket 2040 may be removed from the support brackets by pulling support interface 2044 away from support bracket 2020b and lifting support interface 2042 off of support bracket 2020a. This interface between tilt bracket 2040 and the support brackets allows for ease of installation/ removal as an installer or operator of positioning apparatus 2000 may first mount an electronic display to the mounting brackets and tilt brackets then hang the display onto the support brackets by way of the interface on the tilt brackets.

FIGS. 21A and 21B are side views of positioning apparatus 2000 of FIG. 20A in a tilted position. In this example, first and second support pins 2076 and 2078 are translated within channels 2046 and 2048, respectively, to allow mounting bracket 2060, and an electronic display attached thereto, to tilt in a forward direction. The tilt mechanism 2030 may be configured to utilize the weight of the mounting bracket and the electronic display to create a friction between the support pins and the support channels such that positioning apparatus 2000 will hold a tilt position without an operator having to engage any locks.

Figure 22A:
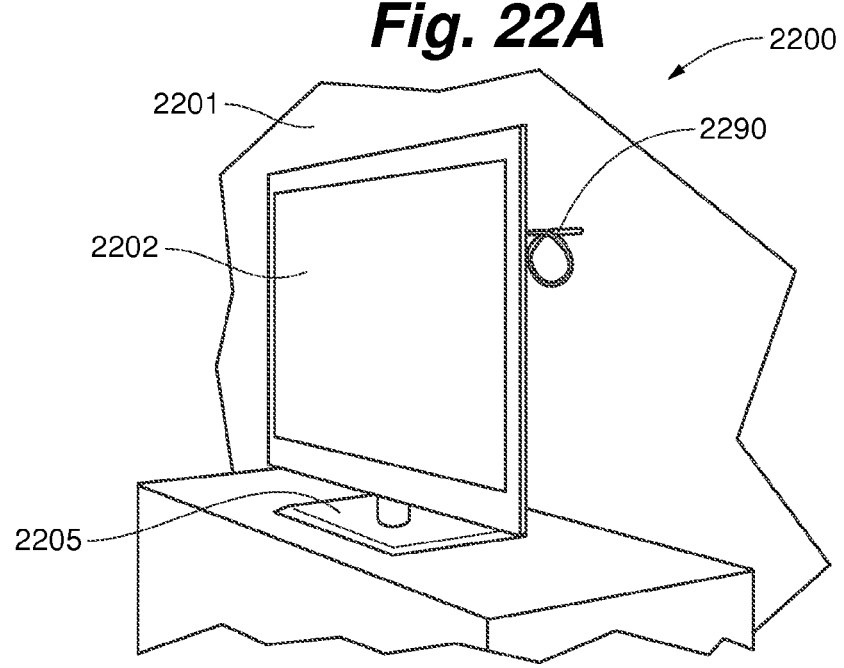
FIG. 22A is a perspective view of a display and positioning apparatus in accordance with an embodiment.
Figure 22B:
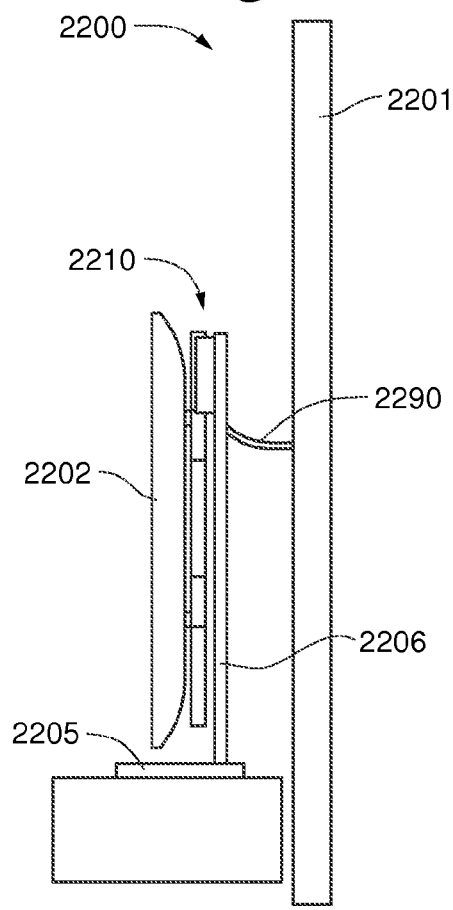
FIGS. 22B and 22C are schematic elevation views of the display and positioning apparatus of FIG. 22A.
Figure 22C:
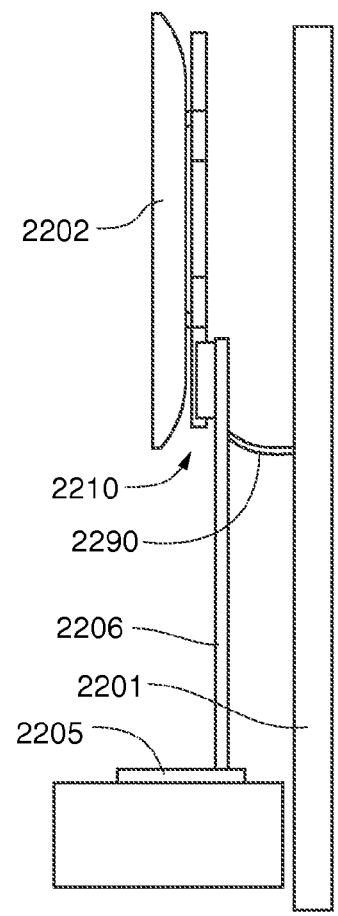

FIG. 22A is a perspective view of a display 2202 and positioning apparatus 2200 in accordance with an embodiment of the invention and FIGS. 22B and 22C are side views of positioning apparatus 2200. Positioning apparatus 2200 incorporates lift mechanism 2210 and is configured to position electronic display 2202 along a range of travel of the lift mechanism. For example, FIG. 22B shows electronic display 2202 positioned at a bottom of the range of travel and FIG. 22C shows electronic display positioned at a top of the range of travel. Electronic display 2202 is coupled to support a bracket which is attached to moving bracket 2012 of lift mechanism 2210. The lift mechanism is attached to support column 2206 of base 2205. Positioning apparatus also includes tether 2290 which may be attached to support column 2206 and wall 2201 to prevent the tipping of base 2205. Positioning apparatus 2200 may also include tilt brackets to provide for the tilting of electronic display 2202.

FIG. 23A is a perspective view of a display 2302 and positioning apparatus 2300 in accordance with an embodiment of the invention, and FIGS. 23B and 23C are side views 2300 showing display 2302 positioned at a bottom and top of a range of travel of positioning apparatus 2300, respectively. Lift mechanism 2310 of positioning apparatus 2300 may be attached directly to a wall 2301.

Figure 24A:
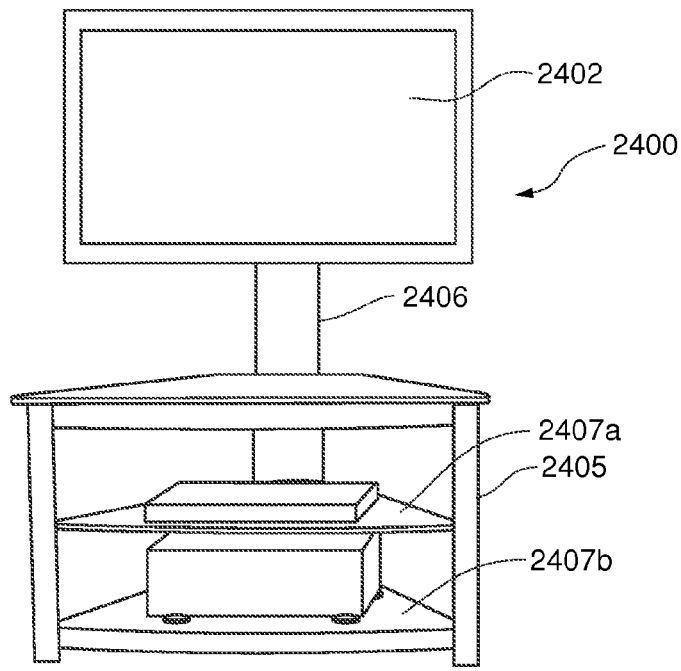
FIG. 24A is a perspective view of a display and positioning apparatus in accordance with an embodiment.
Figure 24C:
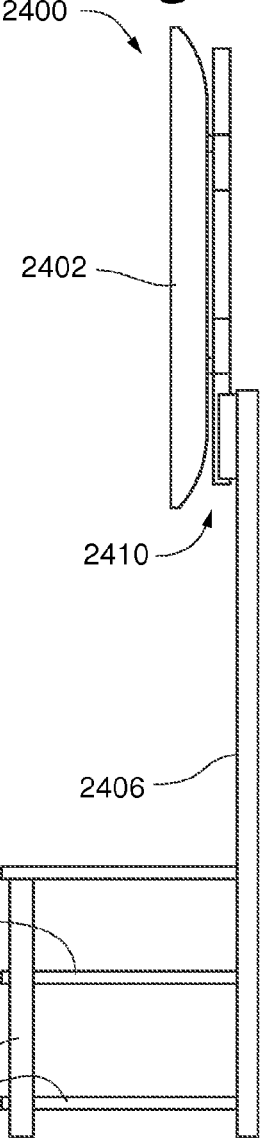
FIGS. 24B and 24C are schematic elevation views of the display and positioning apparatus of FIG. 24A.
Figure 24B:
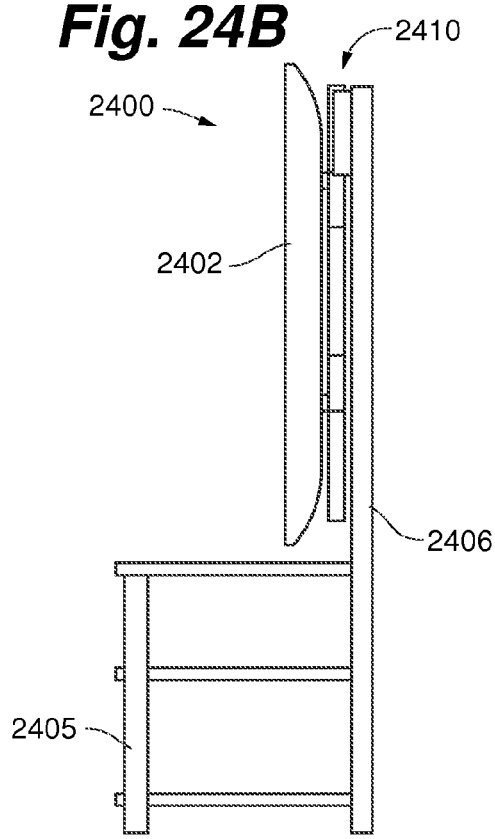

FIG. 24A is a perspective view of a display 2402 and positioning apparatus 2400 in accordance with an embodiment of the invention, and FIGS. 24B, and 24C are side views showing display 2402 positioned at a bottom and top of a range of travel of positioning apparatus 2400, respectively. Lift mechanism 2410 of positioning apparatus 2400 may be attached to support column 2406 of base 2405. Base 2405 may be enlarged to provide a larger base to better support the collective weight of the positioning apparatus and the display. Additionally, base 2405 may include shelves 2407a and 2407b which may be used for storage or any other suitable purpose.

FIG. 25A is a perspective view of a display 2502 and positioning apparatus 2500 in accordance with an embodiment of the invention, and FIGS. 25B and 25C are side views showing display 2502 positioned at a bottom and top of a range of travel of positioning apparatus 2500, respectively. Lift mechanism 2510 of positioning apparatus may be attached to mounting arm 2580. Mounting arm 2580 is attached to wall 2501 and may be adapted to translate electronic display 2500 horizontally relative to wall bracket 2581. Additionally, the mounting arm may be configured to change a horizontal viewing angle of the display.

Figure 26A:
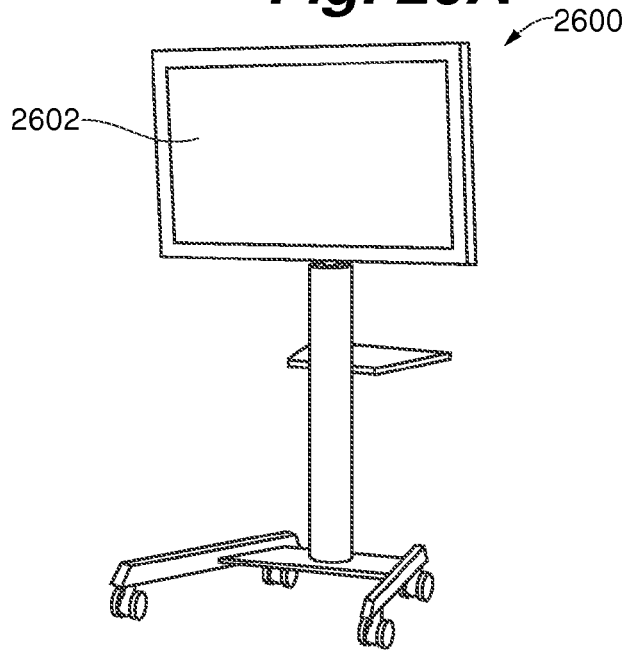
FIG. 26A is a perspective view of a display and positioning apparatus in accordance with an embodiment.
Figure 26C:
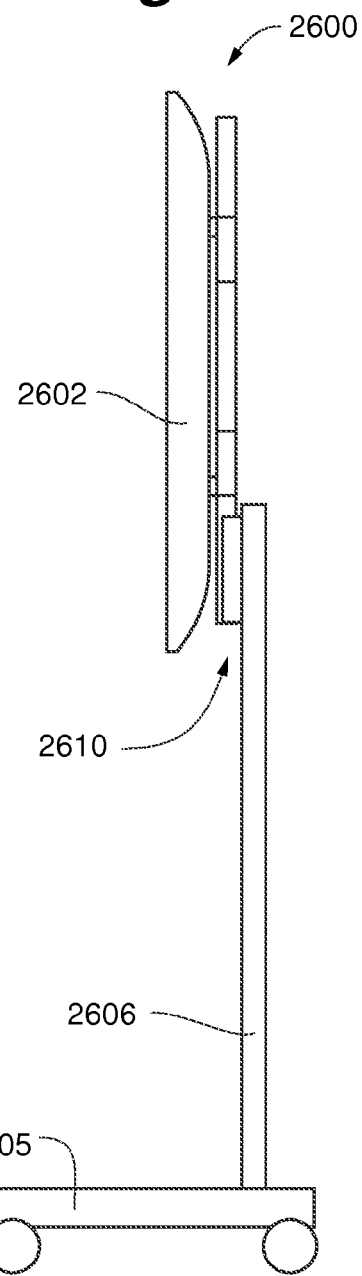
FIGS. 26B and 26C are schematic elevation views of the display and positioning apparatus of FIG. 26A.
Figure 26B:
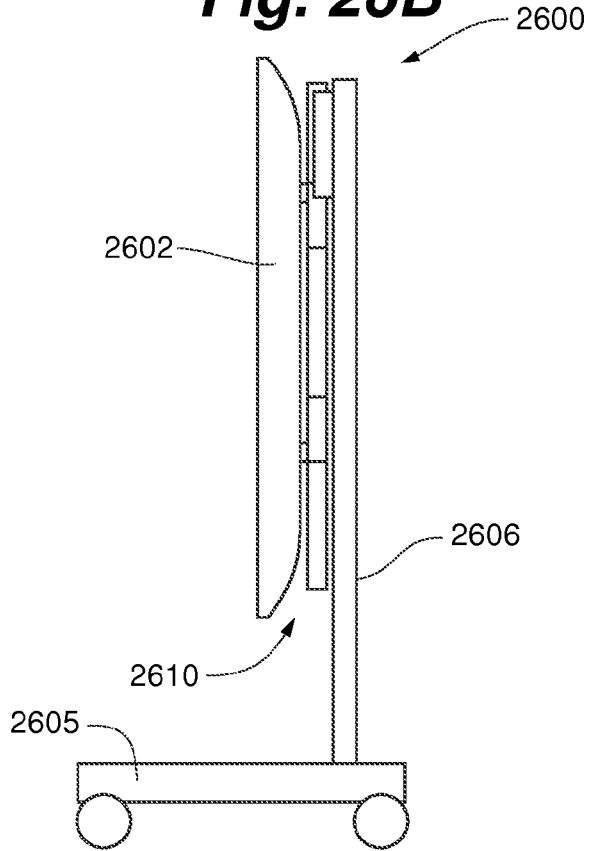

FIG. 26A is a perspective view of a display 2602 and positioning apparatus 2600 in accordance with an embodiment of the invention, and FIGS. 26B and 26C are side views showing display 2602 positioned at a bottom and a top of a range of travel of positioning apparatus 2600, respectively. Lift mechanism 2610 of positioning apparatus 2600 may be attached to support column 2606 of movable base 2605. Movable base 2605 may include wheels which allows for the positioning of the display as well as increased mobility to transport the display.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A counterbalancing lift mechanism for raising and lowering an electronic display, comprising:
    a support bracket configured to be coupled to a support member;
    a moving bracket configured to be coupled to an electronic display;
    a sliding mechanism coupled between the support bracket and the moving bracket, providing the moving bracket with a range of travel relative to the support bracket including a low position and a high position;
    a spring assembly mounted to the moving bracket, the spring assembly configured to generate a first force for countering a second force corresponding to a weight of the electronic display coupled to the moving bracket, the spring assembly having a first end coupled to the moving bracket and a second end that moves through a range of deflection as the moving bracket moves through the range of travel;
    a transition assembly configured to deflect the spring assembly a shorter length than the length of a corresponding movement of the moving bracket along the range of travel, wherein the transition assembly comprises a first transition pulley and a second transition pulley, the first and second transition pulleys being rotationally fixed relative to one another and configured to provide a first travel multiplier for transitioning between deflections of the spring assembly and corresponding movements of the moving bracket;
    a cam assembly comprising a cam and a wheel; and
    a plurality of cables operatively coupling the moving bracket to the support bracket in combination with the spring assembly, the transition assembly, and the cam assembly.

2. The lift mechanism of claim 1, wherein the range of travel is at least about three times longer than the range of deflection.

3. The lift mechanism of claim 1, wherein the first travel multiplier is at least about two.

4. The lift mechanism of claim 1, wherein the cam and the wheel of the cam assembly are rotationally fixed relative to one another and configured to provide a second travel multiplier for transitioning between deflections of the spring assembly and corresponding movements of the moving bracket.

5. The lift mechanism of claim 1, wherein the plurality of cables comprise first, second, and third cables, wherein the first cable couples the second end of the spring assembly to the cam, the second cable couples the cam assembly wheel to the first transition pulley, and the third cable couples the second transition pulley to the support bracket.

6. The lift mechanism of claim 1, wherein the spring assembly comprises first and second spring guide brackets, a plurality of springs, and a plurality of threading elements, wherein each spring has a first end and a second end coupled to the first and the second spring guide brackets, respectively, and wherein each threading element is configured to provide the coupling of the first end of one of the plurality of springs to the first spring guide bracket.

7. The lift mechanism of claim 6, wherein each threading element comprises a fastener section configured to attach the threading element to the first spring guide bracket, a core section configured to position the threading element within a diameter of a spring, and a threading section configured to engage between at least two coils of the spring.

8. The lift mechanism of claim 1, further comprising a braking assembly coupled to the support bracket and configured to lock movement of the support bracket and the moving bracket relative to each other.

9. The lift mechanism of claim 8, wherein
    the moving bracket further comprises a plurality of slots positioned in alignment with the braking assembly on the support bracket as the moving bracket is moved relative to the support bracket;
    wherein the braking assembly comprises
        an axle,
        a braking latch pivotally supported by the axle and configured to engage with the plurality of slots, and
        a brake spring configured to bias the braking latch toward engagement with the plurality of slots; and
    wherein at least one of the plurality of cables is coupled to the braking latch providing a tension opposing the bias of the brake spring to disengage the braking latch from the plurality of slots.

10. A lift mechanism for adjusting a height of an electronic display, comprising:
    a first portion configured to be coupled to a support member;
    a second portion slidingly engaged with the first portion through a range of travel and configured to be coupled to the electronic display;
    a spring assembly mounted to the second portion and configured to exert a variable force, the spring assembly having a first end coupled to the second portion and a second end that moves through a range of deflection as the second portion moves through the range of travel,
    a transition assembly mounted to the second portion, the transition assembly configured to reduce the variable force and deflect the spring assembly a shorter length than the length of a corresponding movement of the second portion along the range of travel, the transition assembly including a first transition pulley and a second transition pulley, the first and second transition pulleys being rotationally fixed relative to one another and configured to provide a first travel multiplier for transitioning between deflections of the spring assembly and corresponding movements of the second portion, and
    a cam assembly comprising a cam and a wheel mounted to the second portion, the cam assembly configured to convert the reduced variable force into a substantially constant force and apply the substantially constant force to the first portion;

wherein the second portion, the first portion, the spring assembly, the transition assembly and the cam assembly are connected by a plurality of cables.

11. The lift mechanism of claim 10, wherein the cam and the wheel of the cam assembly are rotationally fixed relative to one another and configured to provide a second travel multiplier for transitioning between deflections of the spring assembly and corresponding movements of the second portion.

12. The lift mechanism of claim 10, wherein the spring assembly comprises:
a first guide bracket;
a second guide bracket;
at least one spring having a first end and a second end; and
at least one threading element configured to be coupled to the first guide bracket, the at least one threading element comprising a core section configured to position the threading element within a diameter of a spring and a threading section configured to engage between at least two coils of the spring.

13. The lift mechanism of claim 12, wherein the spring assembly further comprises an adjustment mechanism mounted between the second portion and the first spring guide bracket, the adjustment mechanism configured to adjust a tension across the at least one spring.

14. The lift mechanism of claim 10, further comprising a braking assembly coupled to the first portion and configured to lock relative movement of the first portion and the second portion if the plurality of cables no longer connect the second portion, the first portion, the spring assembly, the transition assembly and the cam assembly.

15. A counterbalancing lift mechanism for raising and lowering an electronic display, comprising:
a support bracket configured to be coupled to a support member;
a moving bracket configured to be coupled to an electronic display;
a sliding mechanism coupled between the support bracket and the moving bracket, providing the moving bracket with a range of travel relative to the support bracket including a low position and a high position;
a spring assembly mounted to the moving bracket, the spring assembly configured to generate a first force for countering a second force corresponding to a weight of the electronic display coupled to the moving bracket, the spring assembly having a first end coupled to the moving bracket and a second end that moves through a range of deflection as the moving bracket moves through the range of travel;
a transition assembly configured to deflect the spring assembly a shorter length than the length of a corresponding movement of the moving bracket along the range of travel;
a cam assembly comprising a cam and a wheel;
a plurality of cables operatively coupling the moving bracket to the support bracket in combination with the spring assembly, the transition assembly, and the cam assembly; and
a braking assembly coupled to the support bracket and configured to lock movement of the support bracket and the moving bracket relative to each other, the braking assembly including an axle, a braking latch pivotally supported by the axle and configured to engage with a plurality of slots, and a brake spring configured to bias the braking latch toward engagement with the plurality of slots;
wherein the moving bracket further defines a plurality of slots positioned in alignment with the braking assembly on the support bracket as the moving bracket is moved relative to the support bracket, and
wherein at least one of the plurality of cables is coupled to the braking latch providing a tension opposing the bias of the brake spring to disengage the braking latch from the plurality of slots.

16. A lift mechanism for adjusting a height of an electronic display, comprising:
a first portion configured to be coupled to a support member;
a second portion slidingly engaged with the first portion through a range of travel and configured to be coupled to the electronic display;
a spring assembly mounted to the second portion and configured to exert a variable force, the spring assembly having a first end coupled to the second portion and a second end that moves through a range of deflection as the second portion moves through the range of travel;
a cam assembly comprising a cam and a wheel mounted to the second portion, the cam assembly configured to convert the reduced variable force into a substantially constant force and apply the substantially constant force to the first portion; and
a transition assembly mounted to the second portion, the transition assembly configured to reduce the variable force and deflect the spring assembly a shorter length than the length of a corresponding movement of the second portion along the range of travel, the transition assembly including first and second transition pulleys having a first rotational range of travel greater than about 360° and wherein the wheel has a second rotational range of travel less than about 360°,
wherein the second portion, the first portion, the spring assembly, the transition assembly and the cam assembly being connected by a plurality of cables.

* * * * *